(12) United States Patent
Graham et al.

(10) Patent No.: US 9,939,872 B2
(45) Date of Patent: Apr. 10, 2018

(54) REDUCED-SIZE USER INTERFACES FOR BATTERY MANAGEMENT

(71) Applicant: Apple Inc., Cupertino, CA (US)

(72) Inventors: David Chance Graham, Campbell, CA (US); Imran Chaudhri, San Francisco, CA (US); Alan C. Dye, San Francisco, CA (US); Christopher Patrick Foss, San Francisco, CA (US); Jonathan P. Ive, San Francisco, CA (US); Kevin M. Lynch, Woodside, CA (US); Christopher Wilson, San Francisco, CA (US); Lawrence Y. Yang, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/817,572

(22) Filed: Aug. 4, 2015

(65) Prior Publication Data
US 2016/0041597 A1    Feb. 11, 2016

Related U.S. Application Data

(60) Provisional application No. 62/129,882, filed on Mar. 8, 2015, provisional application No. 62/047,606, filed
(Continued)

(51) Int. Cl.
G06F 1/32 (2006.01)
G06F 3/01 (2006.01)
(Continued)

(52) U.S. Cl.
CPC ............ *G06F 1/3212* (2013.01); *G06F 1/163* (2013.01); *G06F 1/1694* (2013.01);
(Continued)

(58) Field of Classification Search
CPC ...... G06F 1/3212; G06F 1/3296; G06F 1/163; G06F 1/1694; G06F 3/0488; Y02B 60/1292
See application file for complete search history.

(56) References Cited

U.S. PATENT DOCUMENTS 5,475,653 A    12/1995  Yamada et al.
5,801,700 A     9/1998  Ferguson et al.
(Continued)

FOREIGN PATENT DOCUMENTS

EP    2610701 A1    7/2013
EP    2610701 A9    8/2015
(Continued)

OTHER PUBLICATIONS

Final Office Action received for U.S. Appl. No. 14/838,235, dated Jun. 15, 2016, 18 pages.
(Continued)

*Primary Examiner* — Dennis M Butler
(74) *Attorney, Agent, or Firm* — Dentons US LLP

(57) ABSTRACT

A device with a touch-sensitive display and a battery can determine a battery level of the battery, and in accordance with a determination that the battery level is at or below a first threshold value, cause a haptic output and/or enter a low-power mode. While in low-power mode, the device may produce different outputs in response to user inputs than while in a normal power mode. In some embodiments, while in the low-power mode, the device may display only the time and an indication that the device is in a low-power mode.

48 Claims, 23 Drawing Sheets

Related U.S. Application Data on Sep. 8, 2014, provisional application No. 62/034,103, filed on Aug. 6, 2014.

(51) Int. Cl.
 *G06F 3/041* (2006.01)
 *G06F 3/0488* (2013.01)
 *G06F 1/16* (2006.01)

(52) U.S. Cl.
 CPC ............ *G06F 1/3296* (2013.01); *G06F 3/016* (2013.01); *G06F 3/0412* (2013.01); *G06F 3/0488* (2013.01); *Y02B 60/1292* (2013.01)

(56) References Cited

U.S. PATENT DOCUMENTS

| | | | |
|---|---|---|---|
| 6,002,402 A | 12/1999 | Schacher | |
| 6,191,807 B1 | 2/2001 | Hamada et al. | |
| 6,323,846 B1 | 11/2001 | Westerman et al. | |
| 6,362,842 B1 | 3/2002 | Tahara et al. | |
| 6,570,557 B1 | 5/2003 | Westerman et al. | |
| 6,677,932 B1 | 1/2004 | Westerman | |
| 6,809,724 B1 | 10/2004 | Shiraishi et al. | |
| 7,365,736 B2 | 4/2008 | Marvit et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,789,225 B2 | 9/2010 | Whiteis | |
| 7,834,861 B2 | 11/2010 | Lee | |
| 7,844,914 B2 | 11/2010 | Andre et al. | |
| 7,908,219 B2 | 3/2011 | Abanami et al. | |
| 7,957,762 B2 | 6/2011 | Herz et al. | |
| 8,006,002 B2 | 8/2011 | Kalayjian et al. | |
| 8,121,586 B2 | 2/2012 | Araradian et al. | |
| 8,239,784 B2 | 8/2012 | Hotelling et al. | |
| 8,255,830 B2 | 8/2012 | Ording et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,572,493 B2 | 10/2013 | Qureshi | |
| 8,811,951 B1 | 8/2014 | Faaborg et al. | |
| 8,922,485 B1 | 12/2014 | Lloyd | |
| 9,185,062 B1 | 11/2015 | Yang et al. | |
| 9,207,835 B1 | 12/2015 | Yang et al. | |
| 2002/0015024 A1 | 2/2002 | Westerman et al. | |
| 2002/0037715 A1 | 3/2002 | Mauney et al. | |
| 2004/0070511 A1 | 4/2004 | Kim | |
| 2005/0190059 A1 | 9/2005 | Wehrenberg | |
| 2005/0191159 A1 | 9/2005 | Benko | |
| 2005/0268237 A1 | 12/2005 | Crane et al. | |
| 2006/0017692 A1 | 1/2006 | Wehrenberg et al. | |
| 2006/0019649 A1 | 1/2006 | Feinleib et al. | |
| 2006/0026245 A1 | 2/2006 | Cunningham et al. | |
| 2006/0026536 A1 | 2/2006 | Hotelling et al. | |
| 2006/0033724 A1 | 2/2006 | Chaudhri et al. | |
| 2006/0195787 A1 | 8/2006 | Topiwala et al. | |
| 2006/0197753 A1 | 9/2006 | Hotelling | |
| 2007/0036300 A1 | 2/2007 | Brown et al. | |
| 2007/0085157 A1 | 4/2007 | Fadell et al. | |
| 2007/0150834 A1 | 6/2007 | Muller et al. | |
| 2007/0150836 A1 | 6/2007 | Deggelmann et al. | |
| 2007/0150842 A1 | 6/2007 | Chaudhri et al. | |
| 2007/0216659 A1 | 9/2007 | Amineh | |
| 2007/0236475 A1 | 10/2007 | Wherry | |
| 2008/0014989 A1 | 1/2008 | Sandegard et al. | |
| 2008/0057926 A1 | 3/2008 | Forstall et al. | |
| 2008/0070593 A1 | 3/2008 | Altman et al. | |
| 2008/0079589 A1 | 4/2008 | Blackadar | |
| 2008/0165136 A1 | 7/2008 | Christie et al. | |
| 2008/0320391 A1 | 12/2008 | Lemay et al. | |
| 2009/0005011 A1 | 1/2009 | Christie et al. | |
| 2009/0037536 A1 | 2/2009 | Braam | |
| 2009/0049502 A1 | 2/2009 | Levien et al. | |
| 2009/0051648 A1 | 2/2009 | Shamaie et al. | |
| 2009/0055494 A1 | 2/2009 | Fukumoto et al. | |
| 2009/0164219 A1 | 6/2009 | Yeung et al. | |
| 2009/0181726 A1 | 7/2009 | Vargas et al. | |
| 2009/0187842 A1 | 7/2009 | Collins et al. | |
| 2009/0298444 A1 | 12/2009 | Shigeta | |
| 2010/0124906 A1 | 5/2010 | Hautala | |
| 2010/0325194 A1 | 12/2010 | Williamson et al. | |
| 2010/0332518 A1 | 12/2010 | Song et al. | |
| 2011/0059769 A1 | 3/2011 | Brunolli | |
| 2011/0080356 A1 | 4/2011 | Kang et al. | |
| 2011/0151418 A1 | 6/2011 | Delespaul et al. | |
| 2011/0157046 A1 | 6/2011 | Kim et al. | |
| 2011/0164058 A1 | 7/2011 | Lemay | |
| 2011/0183650 A1 | 7/2011 | McKee | |
| 2011/0254684 A1 | 10/2011 | Antoci et al. | |
| 2011/0265041 A1 | 10/2011 | Ganetakos et al. | |
| 2011/0279323 A1 | 11/2011 | Hung et al. | |
| 2011/0306393 A1 | 12/2011 | Goldman et al. | |
| 2011/0316769 A1* | 12/2011 | Boettcher | G06F 1/1684 345/156 |
| 2012/0008526 A1 | 1/2012 | Borghei et al. | |
| 2012/0022872 A1 | 1/2012 | Gruber et al. | |
| 2012/0102437 A1 | 4/2012 | Worley et al. | |
| 2012/0105358 A1 | 5/2012 | Momeyer et al. | |
| 2012/0108215 A1 | 5/2012 | Kameli et al. | |
| 2012/0117507 A1 | 5/2012 | Tseng et al. | |
| 2012/0131458 A1 | 5/2012 | Hayes et al. | |
| 2012/0150970 A1 | 6/2012 | Peterson et al. | |
| 2012/0172088 A1 | 7/2012 | Kirch et al. | |
| 2012/0239949 A1* | 9/2012 | Kalyanasundaram | G06F 1/3212 713/320 |
| 2012/0302256 A1 | 11/2012 | Pai et al. | |
| 2012/0304084 A1 | 11/2012 | Kim et al. | |
| 2012/0306770 A1 | 12/2012 | Moore et al. | |
| 2013/0065566 A1 | 3/2013 | Gisby et al. | |
| 2013/0091298 A1 | 4/2013 | Ozzie et al. | |
| 2013/0159941 A1 | 6/2013 | Langlois et al. | |
| 2013/0212470 A1 | 8/2013 | Karunamuni et al. | |
| 2013/0222236 A1 | 8/2013 | Gärdenfors et al. | |
| 2013/0234924 A1 | 9/2013 | Janefalkar et al. | |
| 2013/0244633 A1* | 9/2013 | Jacobs | H04W 68/00 455/415 |
| 2013/0254714 A1 | 9/2013 | Shin et al. | |
| 2013/0262298 A1 | 10/2013 | Morley | |
| 2013/0310089 A1 | 11/2013 | Gianoukos et al. | |
| 2013/0322634 A1 | 12/2013 | Bennett et al. | |
| 2014/0055552 A1 | 2/2014 | Song et al. | |
| 2014/0073256 A1 | 3/2014 | Newham et al. | |
| 2014/0085487 A1 | 3/2014 | Park et al. | |
| 2014/0136990 A1 | 5/2014 | Gonnen et al. | |
| 2014/0181183 A1 | 6/2014 | Yamamoto et al. | |
| 2014/0240122 A1 | 8/2014 | Roberts et al. | |
| 2014/0365944 A1 | 12/2014 | Moore et al. | |
| 2015/0007049 A1* | 1/2015 | Langlois | H04L 51/24 715/752 |
| 2015/0040029 A1 | 2/2015 | Koum et al. | |
| 2015/0102992 A1* | 4/2015 | Klement | G06F 1/3228 345/102 |
| 2015/0172393 A1 | 6/2015 | Oplinger et al. | |
| 2015/0185849 A1* | 7/2015 | Levesque | G06F 3/016 340/636.1 |
| 2015/0248389 A1 | 9/2015 | Kahn et al. | |
| 2015/0286387 A1 | 10/2015 | Gu et al. | |
| 2015/0286391 A1 | 10/2015 | Jacobs et al. | |
| 2015/0350141 A1 | 12/2015 | Yang et al. | |
| 2016/0054841 A1 | 2/2016 | Yang et al. | |
| 2016/0062540 A1* | 3/2016 | Yang | G06F 3/0481 345/173 |
| 2016/0065707 A1 | 3/2016 | Yang et al. | |
| 2016/0065708 A1 | 3/2016 | Yang et al. | |

(56) References Cited

U.S. PATENT DOCUMENTS

| | | | |
|---|---|---|---|
| 2016/0066277 | A1 | 3/2016 | Yang et al. |
| 2017/0048686 | A1 | 2/2017 | Chang et al. |

FOREIGN PATENT DOCUMENTS

| | | |
|---|---|---|
| KR | 10-2004-0089329 A | 10/2004 |
| WO | 2012/128824 A1 | 9/2012 |
| WO | 2013/093558 A1 | 6/2013 |
| WO | 2013/169875 A2 | 11/2013 |
| WO | 2014/105276 A1 | 7/2014 |
| WO | 2015/038684 A1 | 3/2015 |
| WO | 2015/120358 A1 | 8/2015 |

OTHER PUBLICATIONS

Invitation to Pay Additional Fees received for PCT Patent Application No. PCT/US2015/044083, dated Nov. 4, 2015, 11 pages.
Notice of Allowance received for Chinese Patent Application No. 201520669842.6, dated May 18, 2016, 4 pages (2 pages of English Translation and 2 pages of Official copy).
Samsung, "SM-R380", User Manual, 2014, 78 pages.
Non-Final Office Action received for U.S. Appl. No. 14/503,376, dated Dec. 22, 2014, 21 pages.
Notice of Allowance received for U.S. Appl. No. 14/503,376, dated Jul. 29, 2015, 13 pages.
Notice of Allowance received for U.S. Appl. No. 14/503,376, dated Sep. 2, 2015, 2 pages.
Notice of Allowance received for U.S. Appl. No. 14/503,376, dated Sep. 24, 2015, 5 pages.
Non Final Office Action received for U.S. Appl. No. 14/503,386, dated Jan. 7, 2015, 19 pages.
Notice of Allowance received for U.S. Appl. No. 14/503,386, dated Jul. 30, 2015, 12 pages.
Notice of Allowance received for U.S. Appl. No. 14/503,386, dated Sep. 24, 2015, 5 pages.
Office Action received for Australian Patent Application No. 2015100711, dated Jul. 27, 2015, 7 pages.
Office Action Received for Australian Patent Application No. 2015100711, dated Nov. 19, 2015, 6 pages.
Office Action received for Chinese Patent Application No. 201520365358.4, dated Aug. 11, 2015, 4 pages (2 pages of English Translation and 2 pages of Official Copy).
Office Action received for Chinese Patent Application No. 201520365843.1, dated Aug. 25, 2015, 4 pages (2 pages of English Translation and 2 pages of Official Copy).
Office Action received for Danish Patent Application No. PA201570550, dated Dec. 7, 2015, 6 pages.
International Search Report and Written Opinion received for PCT Patent Application No. PCT/US2015/032305, dated Sep. 10, 2015, 10 pages.
International Search Report and Written Opinion received for PCT Patent Application No. PCT/US2015/032309, dated Sep. 2, 2015, 10 pages.
Invitation to Pay Additional Fees and Partial Search Report received for PCT Patent Application No. PCT/US2015/043487, dated Nov. 9, 2015, 4 pages.
Cnet download.com., "WeChat for Android", Available at <http://download.cnet.com/WeChat/3000-2150_4-75739423.html>, Jan. 7, 2013, 6 pages.
digitalstreetsa.com., "Why WeChat might kill Whatsapp's future . . .", Available at <http://digitalstreetsa.corn/why-wechatmight-kill-whatsapps-future/>, Accessed on Jul. 3, 2013, 10 pages.
Grothaus, Michael., "WhatsApp Introduces Major New Audio Features", Engadget, Available at <http://www.engadget.com/2013/08/07/whatsapp-introduces-major-new-audio-features/>, Accessed on Aug. 7, 2013, 4 pages.

Norman, Don., "Affordances and Design", Jng.org, Available at <http://ind.org/dn.mss/affordances_and.html> , Accessed on Aug. 24, 2015, 5 pages.
S, Rohan., "WeChat Review—Communication Application with Screenshots", Absolute Blogger Oct. 19, 2010, Available at <http://www.absoluteblogger.com/2012/10/wechat-review-communication-application.html> , Accessed on Apr. 7, 2015 , 5 pages.
"WeChat TVC—Hold to Talk", YouTube video: <https://www.youtube.com/watch?v=E_UxteOWVSo>, Accessed on May 11, 2013.
"WeChat Wiki" May 14, 2013, Available on <http://web.archive.org/web/20130514131044/http://wechat.wikia.com/wiki/WeChat_Wiki >, Accessed on Jan. 4, 2016.
Non-Final Office Action received for U.S. Appl. No. 14/838,235, dated Jan. 5, 2016, 3 pages.
Notice of Allowance received for Chinese Patent Application No. 201520365358.4, dated Nov. 20, 2015, 4 pages (2 pages of English Translation and 2 pages of Official Copy).
Office Action Received for Chinese Patent Application No. 201520365843.1, dated Nov. 16, 2015, 3 pages (English Translation Only).
Office Action received for Danish Patent Application No. PA201570550, dated Jan. 19, 2016, 2 pages.
Invitation to Pay Additional Fees received for PCT Patent Application No. PCT/US2015/046787, dated Dec. 15, 2015.
Samsung Gear 2, User Manual, Available online at < http://www.manualslib.com/download/754923/Samsung-Gear-2.html>, pp. 1-97, 2014.
Office Action received for Australian Patent Application No. 2015101188, dated Apr. 14, 2016, 3 pages.
Notice of Allowance received for Chinese Patent Application No. 201520365843.1, dated Feb. 15, 2016, 5 pages (3 pages of English Translation and 2 pages of official copy).
Office Action received for Chinese Patent Application No. 201520669842.6, dated Dec. 4, 2015, 7 pages (4 pages of English Translation and 3 Pages of Official Copy).
International Search Report and Written Opinion received for PCT Patent Application No. PCT/US2015/043487, dated Jan. 29, 2016, 19 pages.
International Search Report and Written Opinion received for PCT Patent Application No. PCT/US2015/044083, dated Feb. 4, 2016, 33 pages.
International Search Report and Written Opinion received for PCT Patent Application No. PCT/US2015/046787, dated Apr. 1, 2016, 26 pages.
Office Action received for Chinese Patent Application No. 201620393549.6, dated Aug. 18, 2016, 2 pages (1 page of English Translation and 1 page of Official Copy).
Office Action received for Chinese Patent Application No. 201620393748.7, dated Aug. 18, 2016, 2 pages (1 page of English Translation and 1 page of Official Copy).
International Preliminary Report on Patentability received for PCT Patent Application No. PCT/US2015/043487, dated Feb. 16, 2017, 13 pages.
International Search Report and Written Opinion received for PCT Patent Application No. PCT/US2016/046828, dated Dec. 15, 2016, 22 pages.
Invitation to Pay Additional Fees received for PCT Patent Application No. PCT/US2016/046828, dated Sep. 23, 2016, 2 pages.
Non-Final Office Action received for U.S. Appl. No. 14/841,623, dated Feb. 2, 2017, 17 pages.
Non-Final Office Action received for U.S. Appl. No. 15/142,661, dated Jan. 25, 2017, 29 pages.
Notice of Allowance received for U.S. Appl. No. 14/838,235, dated Dec. 29, 2016, 4 pages.
Office Action received for Australian Patent Application No. 2016102028, dated Feb. 13, 2017, 4 pages.
Office Action received for Chinese Patent Application No. 201620393549.6, dated Jan. 13, 2017, 2 Pages (Official Copy only). (See Communication Under 37 CFR § 1.98(a) (3)).
Office Action received for Chinese Patent Application No. 201620393748.7, dated Jan. 13, 2017, 2 Pages (Official Copy only). (See Communication Under 37 CFR § 1.98(a) (3)).

(56) References Cited

OTHER PUBLICATIONS

Intention to Grant received for Denmark Patent Application No. PA201570550, dated Dec. 22, 2016, 2 pages.
International Preliminary Report on Patentability received for PCT Application No. PCT/US2015/032309, dated Dec. 15, 2016, 8 pages.
International Preliminary Report on Patentability received for PCT Patent Application No. PCT/US2015/032305, dated Dec. 15, 2016, 8 pages.
Non-Final Office Action received for U.S. Appl. No. 14/503,355, dated Dec. 30, 2016, 22 pages.
Office Action received for Taiwanese Patent Application No. 104128704, dated Nov. 2, 2016, 12 pages (5 pages of English Translation and 7 pages of Official Copy).
"Samsung Gear 2 User manual", Available at http://www.slideshare.net/badaindonesia/samsung-gear-2-user-manual, Apr. 2014, 5 pages.
Notice of Allowance Received for U.S. Appl. No. 14/838,235, dated Oct. 4, 2016, 7 pages.
Office Action received for Danish Patent Application No. PA201570550, dated Oct. 19, 2016, 3 pages.
Office Action received for Australian Patent Application No. 2016102029, dated Feb. 22, 2017, 4 pages.
Office Action received for Danish Patent Application No. PA201770089, dated Apr. 25, 2017, 10 pages.
Office Action received for German Patent Application No. 212015000194.6, dated Mar. 16, 2017, 2 pages (1 page of English Translation and 1 page of Official Copy).
Office Action received for Australian Patent Application No. 2017100760, dated Jan. 30, 2018, 3 pages.

\* cited by examiner

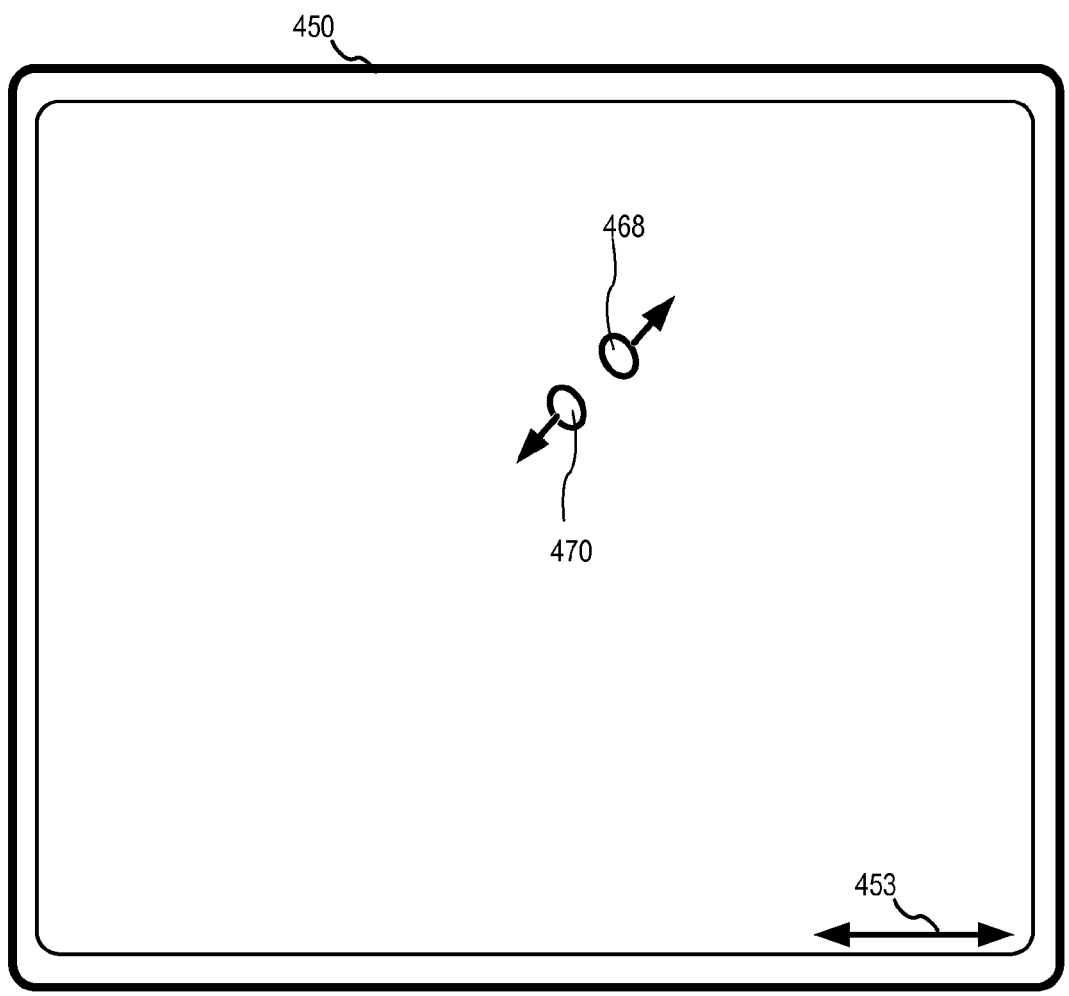
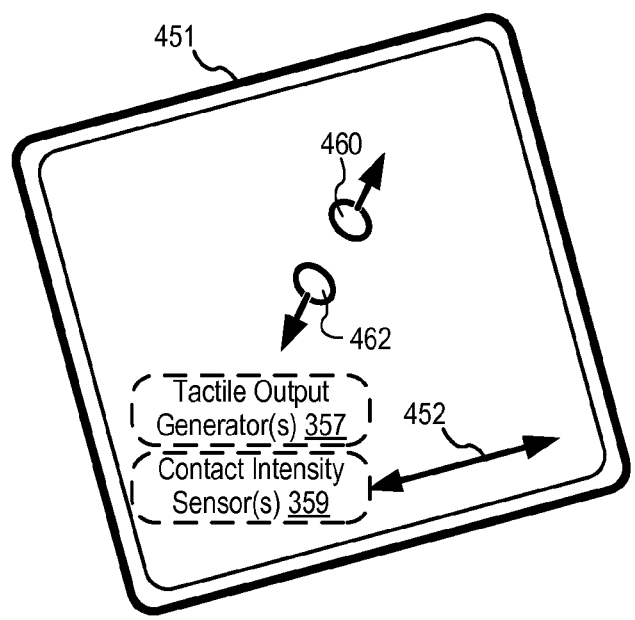
*FIG. 4B*

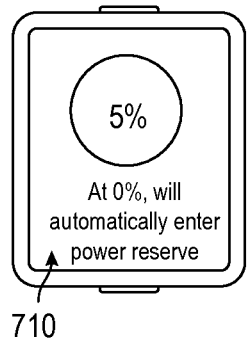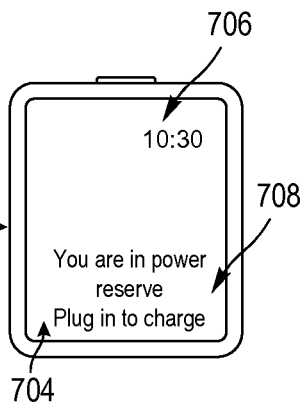
*FIG. 7A*          *FIG. 7B*
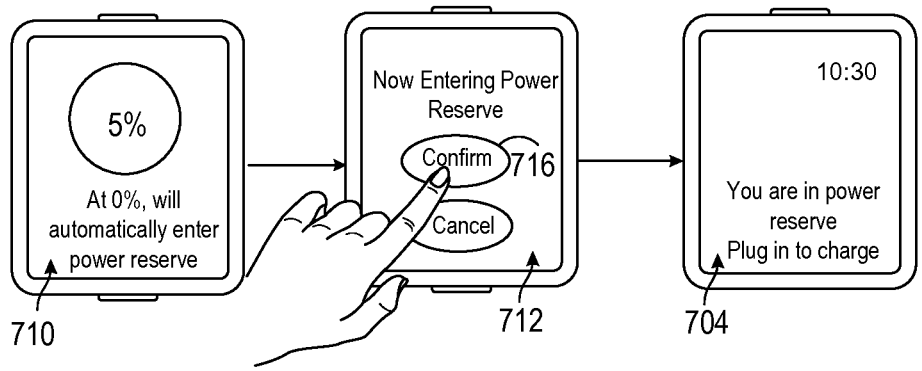
*FIG. 7C*

1400

1402
Determine whether battery level is at or below threshold

1404
In accordance with determination that the battery level is at or below threshold, enter a low-power mode characterized by producing a particular output in response to input at any of touch-sensitive display, hardware button, or rotatable input mechanism.

Optionally, entering the low-power mode comprises displaying a confirmation affordance for confirming that the user wishes to enter the low-power mode, detecting a selection of the confirmation affordance, and, in response to detecting the selection, entering the low-power mode.

Optionally, particular output includes current time.

Optionally, particular output includes indication of battery level.

Optionally, while in low-power mode, particular output is also produced in response to receiving data from an accelerometer and/or gyroscope that exceeds a predetermined value.

*FIG. 14*

REDUCED-SIZE USER INTERFACES FOR BATTERY MANAGEMENT

CROSS-REFERENCE TO RELATED APPLICATIONS

This application claims priority to U.S. Provisional Application Ser. No. 62/129,882, "Reduced-size User Interfaces for Battery Management," filed Mar. 8, 2015, U.S. Provisional Application Ser. No. 62/047,606, "Reduced-size User Interfaces for Battery Management," filed Sep. 8, 2014, and U.S. Provisional Application Ser. No. 62/034,103, "Reduced-size User Interfaces for Battery Management," filed Aug. 6, 2014, the contents of which are hereby incorporated by reference in their entirety.

This application also relates to U.S. Provisional Patent Application Ser. No. 62/033,819, titled "Low Power Mode," filed Aug. 6, 2014; U.S. Provisional Patent Application Ser. No. 62/044,894, titled "Reduced-Size Interfaces for Managing Alerts," filed Sep. 2, 2014; and U.S. Provisional Patent Application Ser. No. 62/026,532, titled "Raise Gesture Detection in a Device," filed Jul. 18, 2014, the contents of which are hereby incorporated by reference in their entirety.

The present disclosure relates generally to computer user interfaces, and more specifically to techniques for managing battery use.

BACKGROUND

Reduced-size personal electronic devices, such as devices that are smaller than cellular phones, may be used as timekeeping devices as well as providing other applications or functions. In cases where the personal electronic device may be the primary timepiece of the user, it may be important to provide timekeeping functionality for a relatively long period of time between charging the battery of the device. The device's timekeeping functionality may supersede the importance of the other applications or functions of the device.

BRIEF SUMMARY

User interfaces that can alert the user to low battery levels and provide user interfaces and methods for extending the device's ability to time-keep are desirable, particularly for battery-powered portable electronic devices where battery conservation is especially beneficial.

In accordance with some embodiments, a method is performed at an electronic device with a touch-sensitive display, a battery, and a haptic mechanism. The method includes determining a battery level of the battery. The method includes, in accordance with a determination that the battery level is at or below a first threshold value, causing the haptic mechanism to issue a haptic output. The method includes receiving data indicative of a user input. The method includes determining whether the data has been received within a predetermined time interval after the haptic output. The method includes, in accordance with a determination that the data has been received within the predetermined time interval, displaying a battery alert on the touch-sensitive display.

In accordance with some embodiments, a method is performed at an electronic device with a touch-sensitive display, a battery, at least one hardware button, and a rotatable input mechanism. The electronic device is configured to, while in a normal power mode, produce a first output responsive to input at the touch-sensitive display, a second output responsive to input at the at least one hardware button, and a third output responsive to input at the rotatable input mechanism. The method includes determining a battery level of the battery. The method includes, in accordance with a determination that the battery level is at or below a first threshold value: entering a low-power mode, the low-power mode characterized in that a fourth output is produced responsive to input at any of the touch-sensitive display, the at least one hardware button, or the rotatable input mechanism.

In accordance with some embodiments, a method is performed at an electronic device with a touch-sensitive display, a battery, and at least two input mechanisms. The method includes receiving first data indicative of an activation of a first input mechanism. The method includes receiving second data indicative of an activation of a second input mechanism, wherein the second data is received within a predetermined elapsed time period from receiving the first data. The method includes, in response to receiving the first data and the second data: determining an amount of time remaining before a level of the battery reaches a first threshold value, displaying the amount of time remaining, displaying an affordance for invoking a low-power mode, detecting a selection of the affordance, and in response to detecting the selection, entering the low-power mode.

In accordance with some embodiments, a non-transitory computer-readable storage medium storing one or more programs comprising instructions is disclosed. The instructions, when executed by one or more processors of an electronic device with a touch-sensitive display, a haptic mechanism, and a battery, cause the electronic device to determine a battery level of the battery; in accordance with a determination that the battery level is at or below a first threshold value, cause the haptic mechanism to issue a haptic output; receive data indicative of a user input; determine whether the data has been received within a predetermined time interval after the haptic output; and in accordance with a determination that the data has been received within the predetermined time interval, display a battery alert on the touch-sensitive display.

In accordance with some embodiments, a non-transitory computer-readable storage medium storing one or more programs comprising instructions is disclosed. The instructions, when executed by one or more processors of an electronic device with a touch-sensitive display, a battery, at least one hardware button, and a rotatable input mechanism, cause the electronic device to, while in a normal power mode, produce a first output responsive to input at the touch-sensitive display, a second output responsive to input at the at least one hardware button, and a third output responsive to input at the rotatable input mechanism; determine a battery level of the battery; and in accordance with a determination that the battery level is at or below a first threshold value, enter a low-power mode, the low-power mode characterized in that a fourth output is produced responsive to input at any of the touch-sensitive display, the at least one hardware button, or the rotatable input mechanism.

In accordance with some embodiments, a non-transitory computer-readable storage medium storing one or more programs comprising instructions is disclosed. The instructions, when executed by one or more processors of an electronic device with a touch-sensitive display, a battery, and at least two input mechanisms, cause the electronic device to receive first data indicative of an activation of a first input mechanism; receive second data indicative of an activation of a second input mechanism, wherein the second data is received within a predetermined elapsed time period from receiving the first data; and in response to receiving the first data and the second data: determine an amount of time remaining before a level of the battery reaches a first threshold value, display the amount of time remaining, display an affordance for invoking a low-power mode, detect a selection of the affordance, and in response to detecting the selection, enter the low-power mode.

In accordance with some embodiments, an electronic device is described. The electronic device includes a battery; a haptic mechanism; a touch-sensitive display; means for determining a battery level of the battery of the electronic device; means for causing the haptic mechanism to issue a haptic output in accordance with a determination that the battery level is at or below a first threshold value; means for receiving data indicative of a user input; means for determining whether the data has been received within a predetermined time interval after the haptic output; and means for displaying a battery alert on the touch-sensitive display in accordance with a determination that the data has been received within the predetermined time interval.

In accordance with some embodiments, an electronic device is described. The electronic device includes a touch-sensitive display; a battery; at least one hardware button; a rotatable input mechanism; means for producing a first output responsive to input at the touch-sensitive display, a second output responsive to input at the at least one hardware button, and a third output responsive to input at the rotatable input mechanism while the electronic device is in normal power mode; means for determining a battery level of the battery; and in accordance with a determination that the battery level is at or below a first threshold value: means for entering a low-power mode, the low-power mode characterized in that a fourth output is produced responsive to input at any of the touch-sensitive display, the at least one hardware button, or the rotatable input mechanism.

In accordance with some embodiments, an electronic device is described. The electronic device includes a touch-sensitive display; a battery; at least two input mechanisms; means for receiving first data indicative of an activation of a first input mechanism; means for receiving second data indicative of an activation of a second input mechanism, wherein the second data is received within a predetermined elapsed time period from receiving the first data; and in response to receiving the first data and the second data: means for determining an amount of time remaining before a level of the battery reaches a first threshold value, means for displaying the amount of time remaining, means for displaying an affordance for invoking a low-power mode, means for detecting a selection of the affordance, and in response to detecting the selection, means for entering the low-power mode.

In accordance with some embodiments, an electronic device is described. The electronic device includes a touch-sensitive display unit; a battery unit; a haptic mechanism unit; and a processing unit coupled to the touch-sensitive display unit, the battery unit, and the haptic mechanism unit. The processing unit is configured to determine a battery level of the battery unit; in accordance with a determination that the battery level is at or below a first threshold value, cause the haptic mechanism unit to issue a haptic output; receive data indicative of a user input; determine whether the data has been received within a predetermined time interval after the haptic output; and in accordance with a determination that the data has been received within the predetermined time interval, enable display of a battery alert on the touch-sensitive display unit.

In accordance with some embodiments, an electronic device is described. The electronic device includes a touch-sensitive display unit; a battery unit; at least one hardware button unit; a rotatable input mechanism unit; and a processing unit coupled to the touch-sensitive display unit, the battery unit, the at least one hardware button unit, and the rotatable input mechanism unit. The processing unit is configured to, while in a normal power mode, produce a first output responsive to input at the touch-sensitive display unit, a second output responsive to input at the at least one hardware button unit, and a third output responsive to input at the rotatable input mechanism unit; determine a battery level of the battery unit; and, in accordance with a determination that the battery level is at or below a first threshold value: enter a low-power mode, the low-power mode characterized in that a fourth output is produced responsive to input at any of the touch-sensitive display unit, the at least one hardware button unit, or the rotatable input mechanism unit.

In accordance with some embodiments, an electronic device is described. The electronic device includes a touch-sensitive display unit; a battery unit; at least two input mechanism units; and a processing unit coupled to the touch-sensitive display unit, the battery unit, and the at least two input mechanism units. The processing unit is configured to: receive first data indicative of an activation of a first input mechanism unit; receive second data indicative of an activation of a second input mechanism unit, wherein the second data is received within a predetermined elapsed time period from receiving the first data; and in response to receiving the first data and the second data: determine an amount of time remaining before a level of the battery unit reaches a first threshold value, enable display of the amount of time remaining, enable display of an affordance for invoking a low-power mode, detect a selection of the affordance, and in response to detecting the selection, enter the low-power mode.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7A illustrates exemplary user interfaces for managing battery levels.

FIG. 7B illustrates exemplary user interfaces for managing battery levels.

FIG. 7C illustrates exemplary user interfaces for managing battery levels.

FIG. 14 is a flow diagram illustrating an exemplary process for displaying a user interface for managing battery levels.

DESCRIPTION OF EMBODIMENTS

Figure 1A:
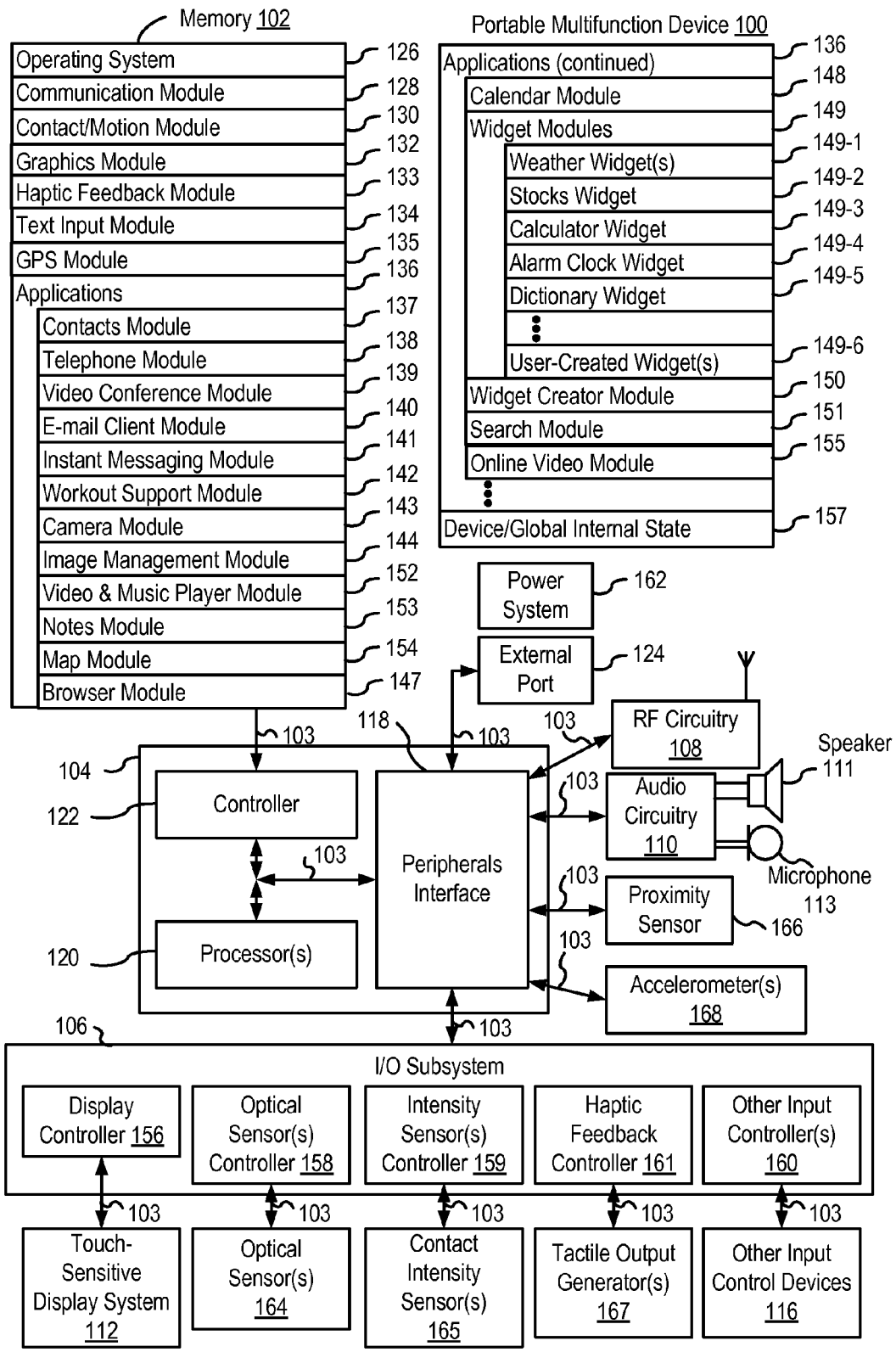
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for methods and user interfaces that alert a user to low battery levels on a reduced-size personal electronic device and enable management of battery life. Such methods and interfaces can conserve power and increase the time between battery charges, and can also reduce the cognitive burden on a user and produce a more efficient human-machine interface.

Below, FIGS. 1A-1B, 2, 3, 4A-4B, 5A-5B, and 16-18 provide a description of exemplary devices for performing the techniques for managing battery levels. FIGS. 6-12 illustrate exemplary user interfaces for managing battery levels. The user interfaces in the figures are also used to illustrate the processes described below, including the processes in FIGS. 13-15.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323, 846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
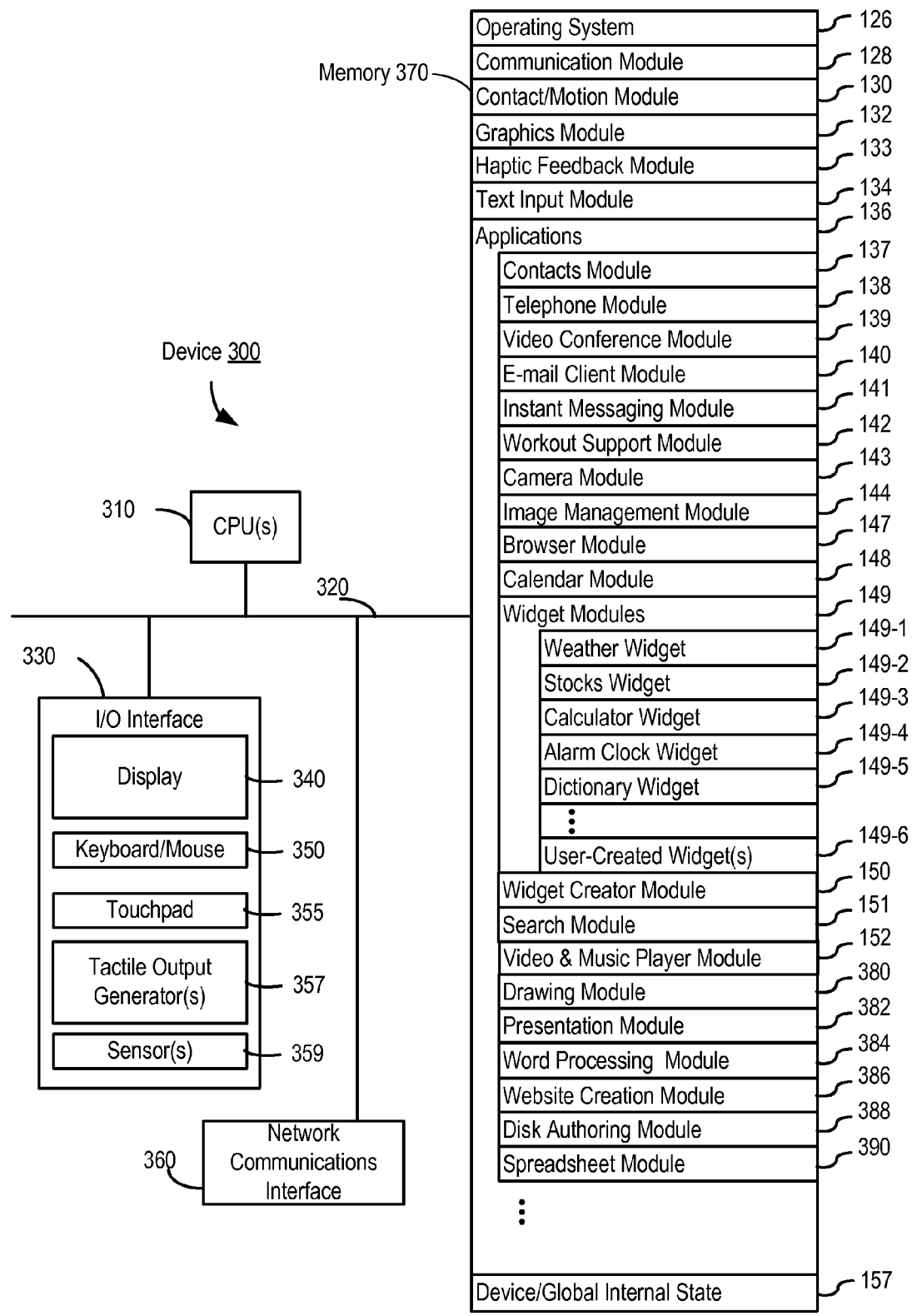
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
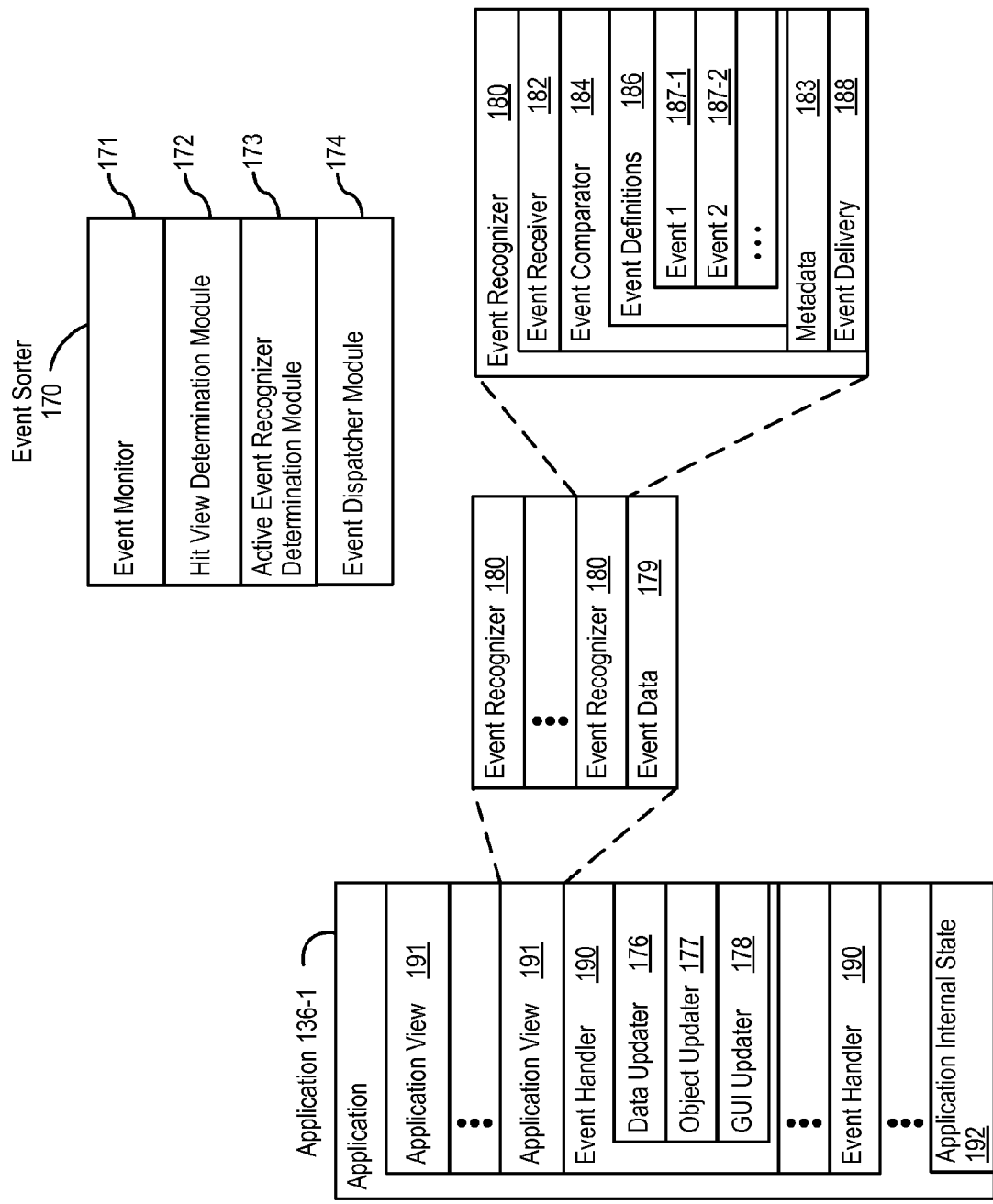
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
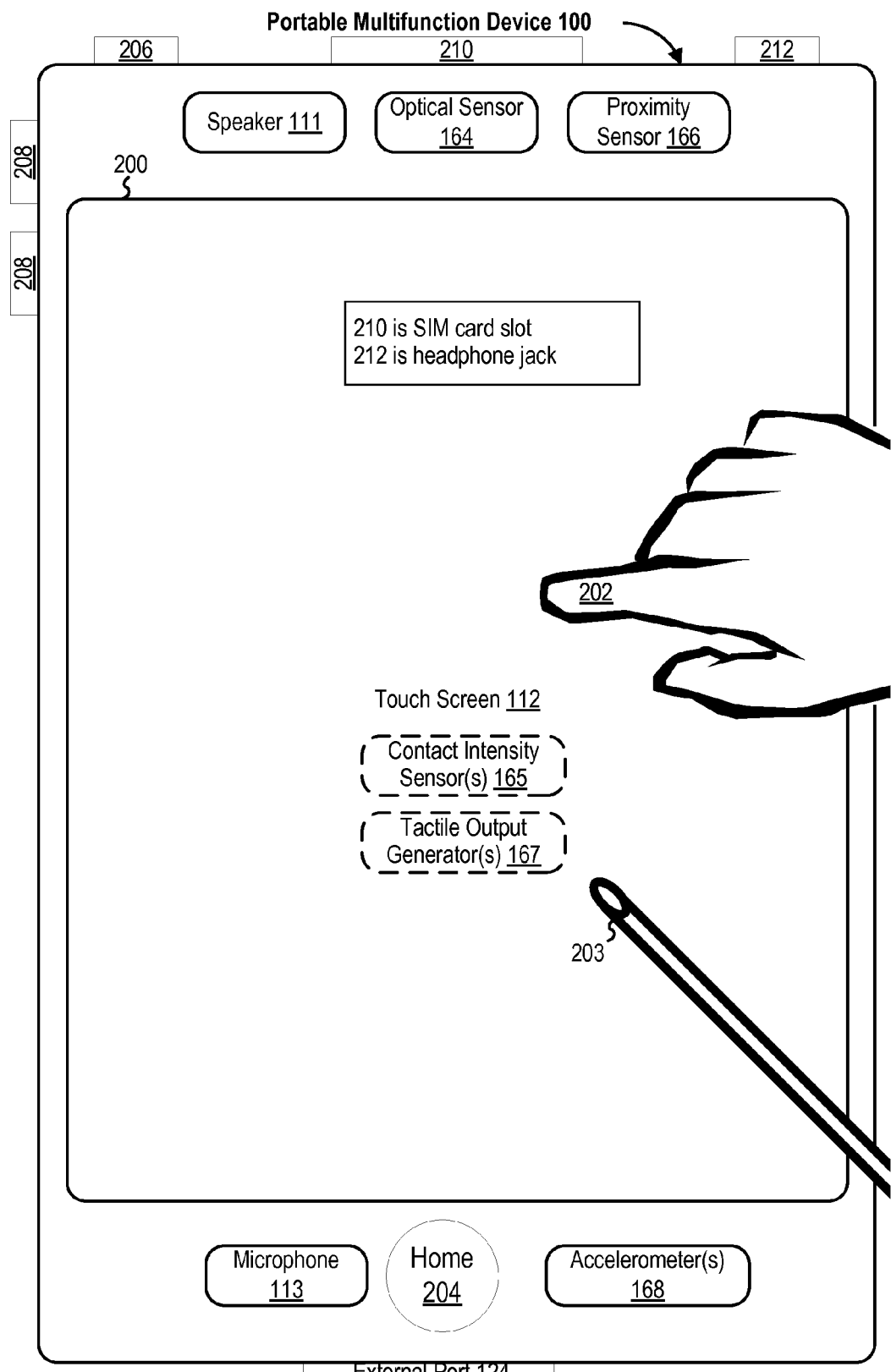
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
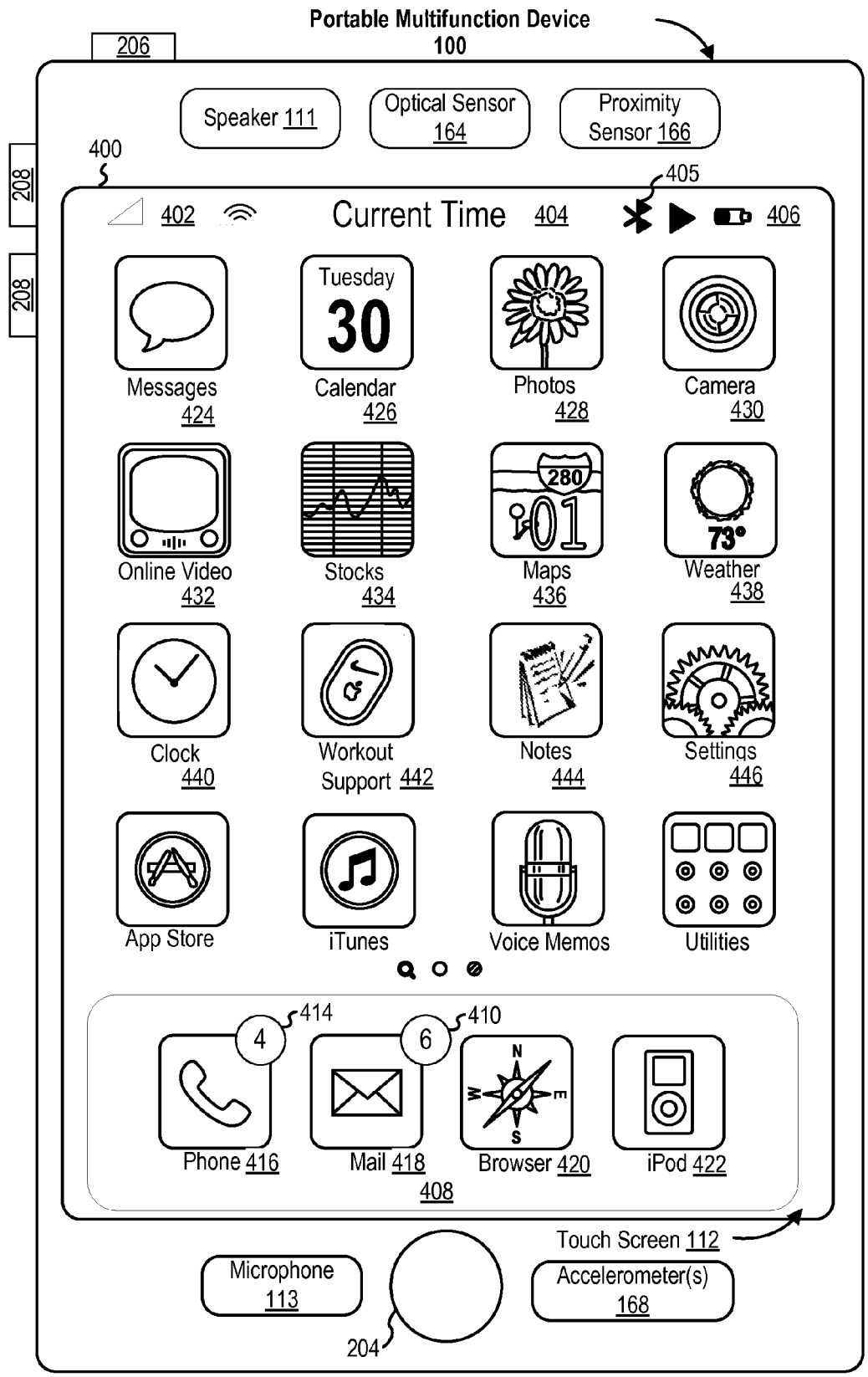
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
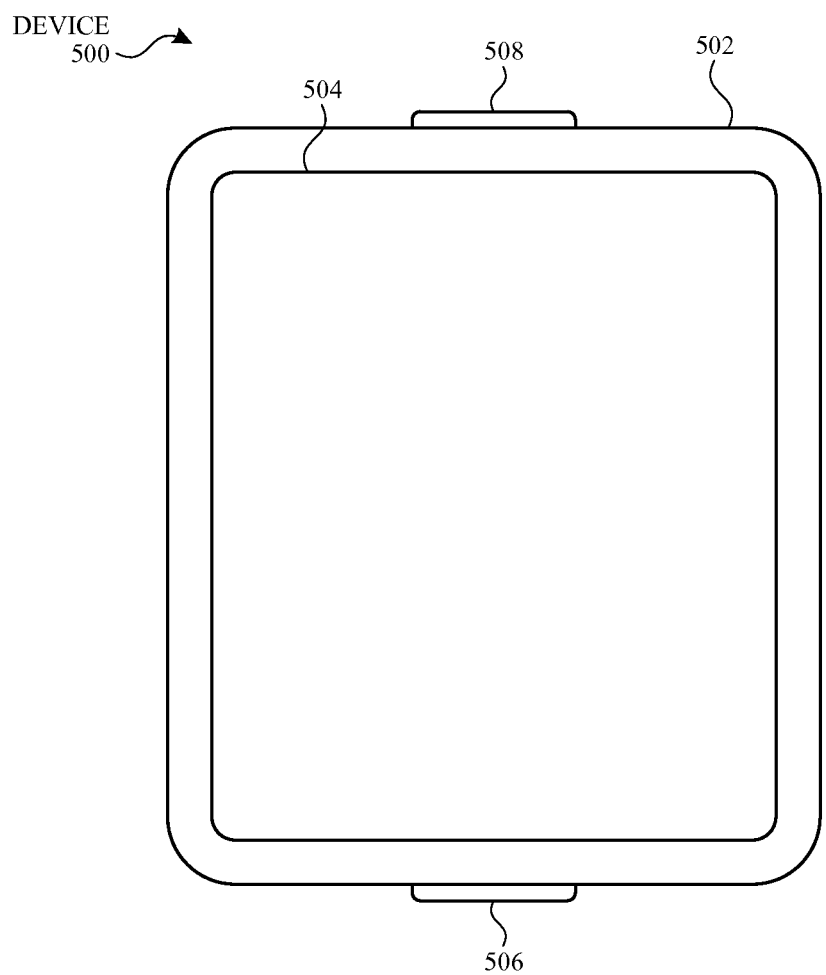
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Ser. No. PCT/US2013/040061, titled "Device, Method, and Graphical User Interface for Displaying User Interface Objects Corresponding to an Application," filed May 8, 2013, and International Patent Application Ser. No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
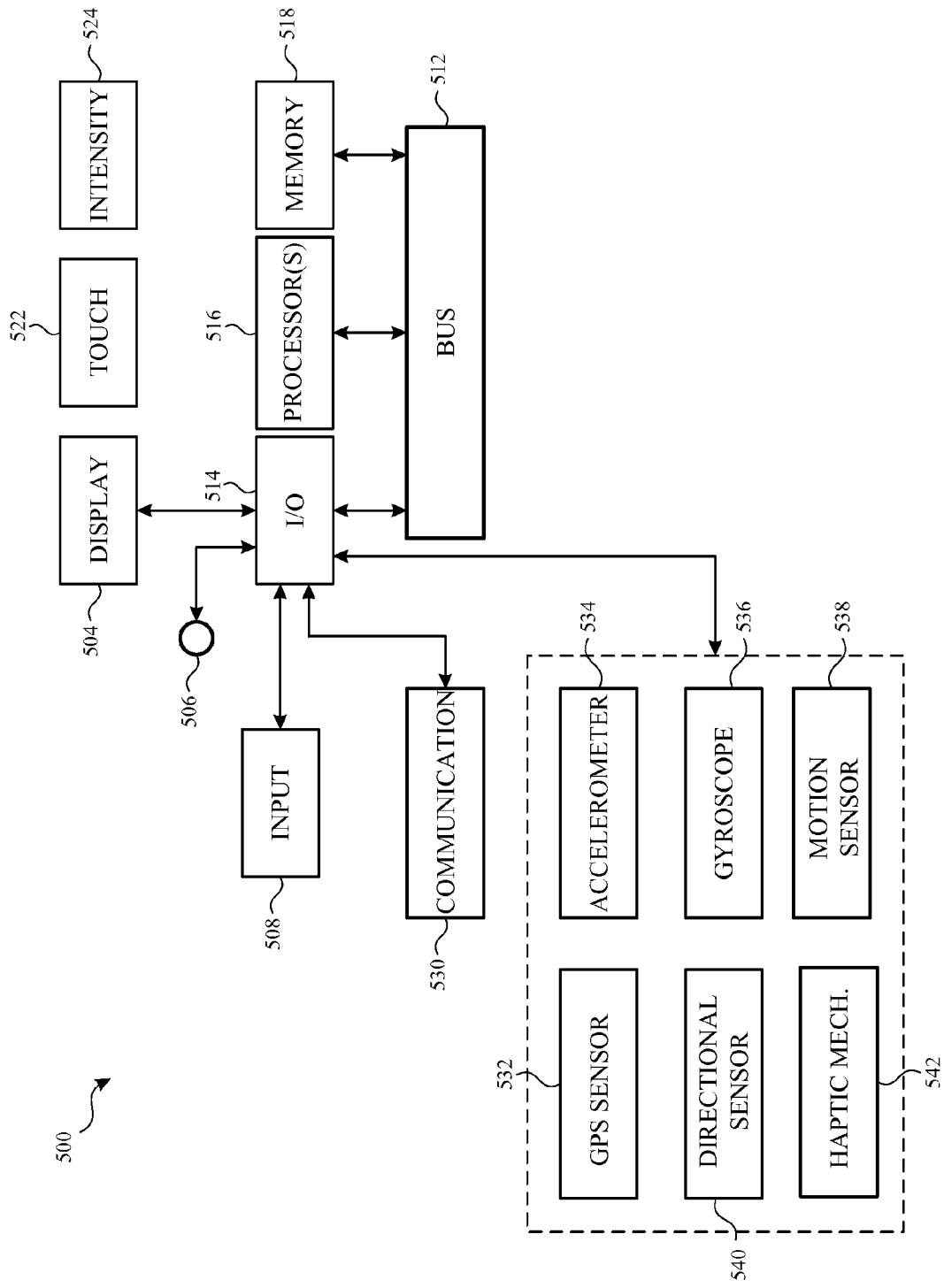
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensor, such as GPS sensor 532, accelerometer 534, directional sensor 540 (e.g., compass), gyroscope 536, motion sensor 538, and/or a combination thereof, all of which can be operatively connected to I/O section 514. Personal electronic device 500 can also include haptic mechanism 542. Haptic mechanism 542 may issue a vibration or other haptic output that can be perceived by a user. In some embodiments, haptic mechanism 542 may issue haptic outputs in a manner similar to that described for tactile output generator 167 of device 100.

Memory 518 of personal electronic device 500 can be a non-transitory computer-readable storage medium, for storing computer-executable instructions, which, when executed by one or more computer processors 516, for example, can cause the computer processors to perform the techniques described above, including processes 1300-1500 (FIGS. 13-15). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Battery User Interfaces

The battery user interfaces described below are illustrated by exemplary sequences of screens that device 500 can display in response to determining various battery levels and detecting various user inputs. In these sequences, the arrows indicate the order in which the screens are displayed.

Displaying Battery Alerts

In some embodiments, a personal electronic device, such as device 500, can have one or more batteries that are collectively referred to as a battery. Device 500 can determine whether its battery level is at or below a threshold value. In some embodiments, device 500 may monitor the battery level continuously or intermittently to determine whether the battery level is at or below a threshold value. In some embodiments, device 500 may receive data indicating that the battery level is at or below the threshold value.

Figure 6:
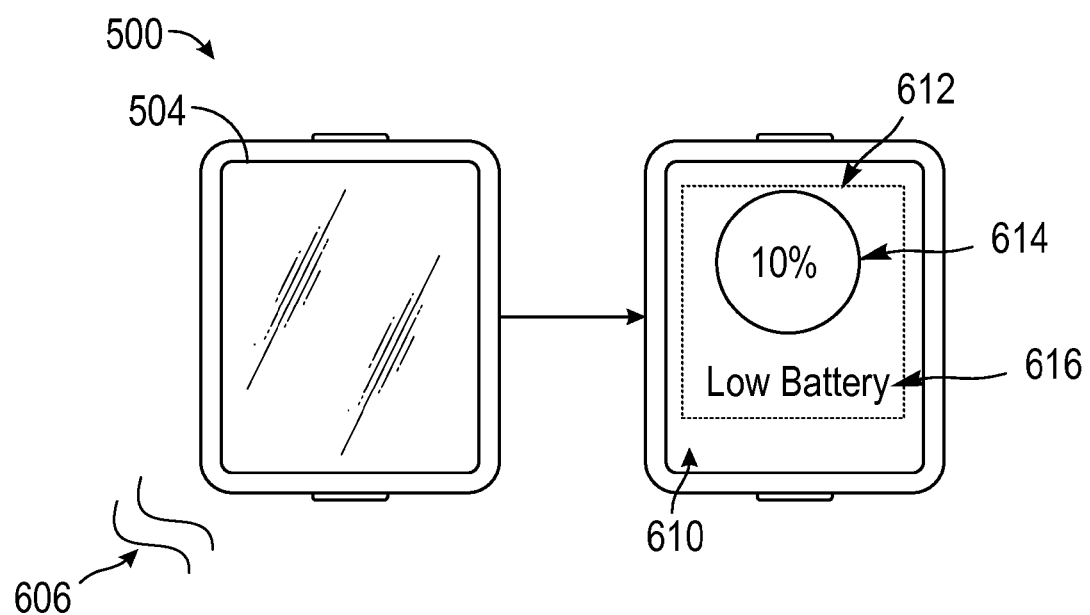
FIG. 6 illustrates exemplary user interfaces for managing battery levels.

FIG. 6 depicts an exemplary screen 610 that device 500 can display on touchscreen 504 in response to a determination that the battery level is at or below a threshold value. As shown in FIG. 6, initially, touchscreen 504 may be inactive. In some embodiments, when touchscreen 504 is inactive, it may be unresponsive to touch inputs, or may not be actively displaying content. In some embodiments, when touchscreen 504 is inactive, it is turned off. Device 500 may determine that the battery level is at or below the threshold value while touchscreen 504 is inactive. In accordance with a determination that the battery level is at or below the threshold value, device 500 can alert the user that the battery level is low by causing a haptic mechanism to issue a haptic output 606, such as a vibration, on device 500 that can be perceived by the user. In some embodiments, instead of causing a haptic output, device 500 can cause an audible or visible output to alert the user that the battery level is low.

In some embodiments, the threshold value may be a percentage of a total battery level. In some embodiments, the total battery level may be the maximum battery capacity; that is, the battery level at which the battery is fully charged. In this scenario, when the battery reaches a threshold value of 0% of the total battery level, the battery is fully discharged.

In some embodiments, the total battery level may be the maximum battery level of the battery minus a reserve amount of battery capacity, where the reserve amount is reserved for performing essential operations such as displaying the current time. In this scenario, when the battery reaches 0% of the total battery level, the battery may still contain the reserve amount of capacity.

The total battery level may be a constant value, or may vary over time due to temperature or degradation. In some embodiments, determining whether the battery level is at or below a threshold value includes determining whether the battery level has fallen to or below the threshold value, as opposed to determining whether the battery level has risen to the threshold value while being charged.

Returning to FIG. 6, after device 500 has determined that the battery level is at or below the threshold value and caused haptic output 606, the user may respond to the haptic output by providing an input to device 500. In response to receiving data indicative of an input from the user within a predetermined time interval after the haptic output, device 500 can display screen 610 with battery alert 612. (The dashed line shown in FIG. 6 is intended to indicate the contents of the battery alert, but may not be displayed on touchscreen 504.) In some embodiments, displaying battery alert 612 involves displaying an animation that slides battery alert 612 upwards from the bottom of touchscreen 504.

In some embodiments, the input from the user may be a movement of device 500 that can be detected by an accelerometer and/or gyroscope on device 500. Such a movement may correspond to the user moving device 500 into a position in which the user can view touchscreen 504. The movement may include a rotation and/or translation of device 500. For example, if device 500 is worn on a user's wrist, the movement may correspond to the user raising their wrist for viewing touchscreen 504. Techniques for detecting a raise gesture are described in U.S. Provisional Patent Application Ser. No. 62/026,532, "Raise Gesture Detection in a Device," filed Jul. 18, 2014, the content of which is hereby incorporated by reference for all purposes.

In other embodiments, the user input may be a touch on touchscreen 504, or a depression and/or rotation of one or more input mechanisms.

Battery alert 612 includes an affordance 614 indicating the battery level. In this example, the affordance includes the percentage of the total battery level. Battery alert 612 also includes a low-battery message 616.

As previously discussed, device 500 can display battery alert 612 in response to receiving data indicative of a user input within a predetermined time interval after device 500 causes the haptic output. In some embodiments, the predetermined time interval may be in the range of 0 seconds to 3 minutes. In other examples, the predetermined time interval may be in the range of 0 seconds to 1 minute. In yet other examples, the predetermined time interval may be set by the user, or may be determined by device 500 based on previous user behavior such as an average of previous elapsed times prior to the user providing the input.

The sequence depicted in FIG. 6 may correspond to the case when the user, having perceived the haptic output caused by device 500, wishes to promptly view battery-related information and therefore moves device 500 into a position suitable for viewing touchscreen 504 within the predetermined time interval.

If device 500 causes the haptic output and then does not detect the user input within the predetermined time interval after the haptic output, device 500 may remain in its initial inactive state without displaying screen 610. This scenario may correspond to the case when the user does not wish to promptly view battery-related information, and therefore does not move device 500 into position for viewing touchscreen 504 after perceiving the haptic output.

In some embodiments, device 500 may cause a first haptic output in response to detecting that the battery level is at or below a first predetermined threshold, and then cause a second haptic output in response to detecting that the battery level is at or below a second predetermined threshold, where the second predetermined threshold is lower than the first predetermined threshold. Thus, device 500 may alert the user multiple times that the battery level is low.

In some embodiments, the first predetermined threshold is 10% of the total battery level, and the second predetermined threshold is 5% of the total battery level. In some embodiments, device 500 may cause haptic outputs at other predetermined thresholds.

In some embodiments, the battery alert displayed in response to detecting the user input may depend on the predetermined threshold. For example, the exemplary battery alert depicted in FIG. 6, corresponding to the case when the threshold is 10% of the total battery level, includes the indication of the threshold value 614 and a low-battery message 612. In contrast, as shown in FIG. 7A, the exemplary battery alert displayed for the case when the threshold is 5% of the total battery level may include a message 710 that device 500 will automatically enter a low-power mode if device 500 subsequently determines that the battery level is at or below a minimum battery level, such as approximately 0% of the total battery level.

As shown in FIG. 7B, in response to a determination that the battery level is at or below the minimum battery level, device 500 can automatically enter a low-power mode and display screen 704. Screen 704 includes the current time 706 and may include an indication 708 that device 500 is in low-power mode. The low-power mode is described in more detail with respect to FIGS. 10A-B.

In some embodiments, as depicted in FIG. 7C, in response to a determination that the battery level is at or below the minimum battery level, device 500 can display screen 712. Screen 712 includes conformation affordance 716 for confirming that the user wishes to place device 500 in the low-power mode. In response to detecting a selection of confirmation affordance 716, device 500 can enter the low-power mode and display screen 704.

Dismissing Battery Alerts

In some embodiments, while screen 610 is displayed (as shown in FIG. 6), if device 500 receives data indicative of a second user input, device 500 can dismiss battery alert 612. Dismissing battery alert 612 may include removing battery alert from touchscreen 504. In some embodiments, dismissing battery alert 612 may include displaying an animation that slides battery alert 612 off the bottom of touchscreen 504.

In some embodiments, the second user input may correspond to a movement of device 500. Returning to the example of device 500 being worn on a wrist, the second user input may correspond to a user moving device 500 out of a viewing position by, for example, rotating device 500 out of position for viewing or lowering their wrist. These scenarios may correspond to the case when the user, having viewed the battery alert, does not wish to continue viewing or interacting with device 500 and therefore moves device 500 out of the viewing position. Device 100 may then return to an inactive state to conserve power.

Figure 8:
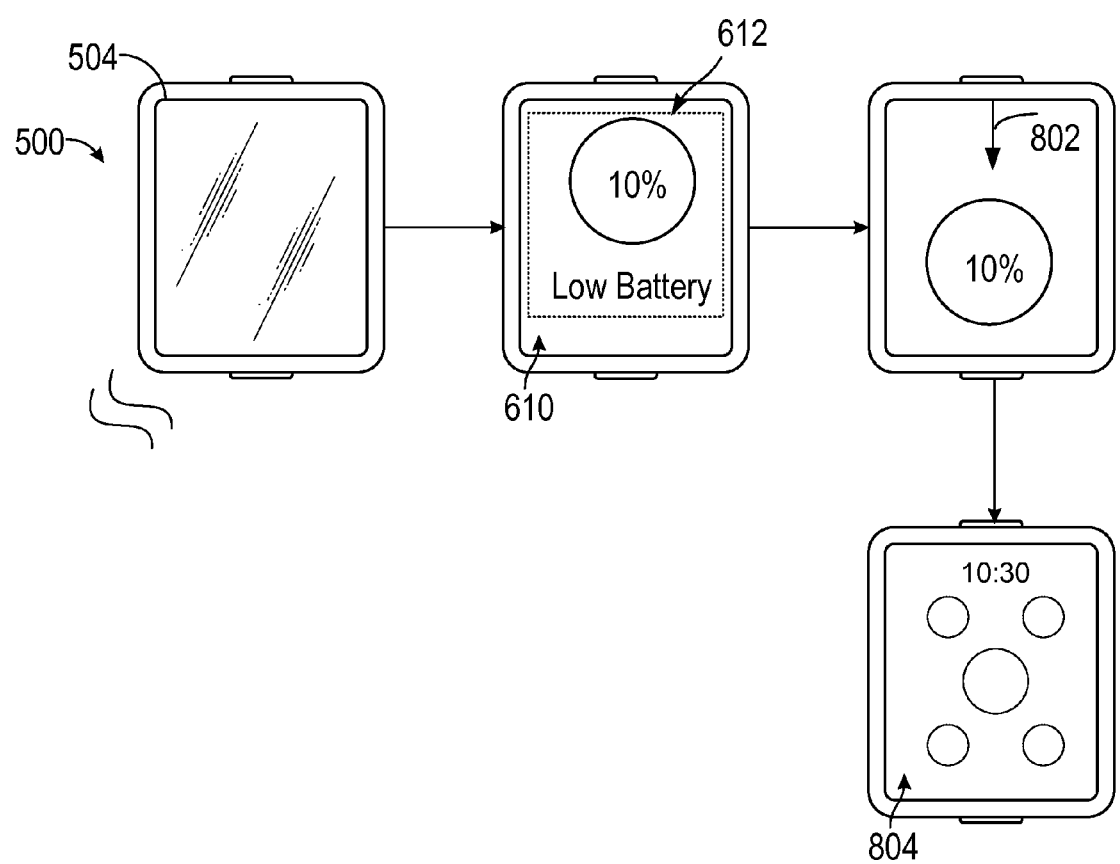
FIG. 8 illustrates exemplary user interfaces for managing battery levels.

In some embodiments, a user may also dismiss a battery alert by making contact with touchscreen 504. As shown in FIG. 8, if while displaying screen 610 device 500 detects a contact on touchscreen 504, then device 500 can slide battery alert 612 downwards on touchscreen 504 and display dismissal indicator 802. The contact may comprise a touch detected on touchscreen 504 at a first location followed by a movement of the touch from the first location to a second location on touchscreen 504 without breaking contact of the detected touch, followed by a release (e.g., a lift-off) of the touch. The movement may be a substantially downward swipe or flick on touchscreen 504, for example. In some embodiments, if the user continues to swipe or flick downwards after the dismissal indicator is displayed, device 500 can dismiss the battery alert.

In some embodiments, device 500 may require the user to swipe or flick most or all of the way down touchscreen 504 to dismiss battery alert 612. For example, device 500 can determine whether the movement of the touch exceeds a threshold distance. If the movement exceeds the threshold distance, then in response to detecting the release of the touch, device 500 can dismiss the battery alert. If the movement does not exceed the threshold distance, then in response to detecting the release of the touch, device 500 can slide the battery alert back to its original position on touchscreen 504 without dismissing battery alert 612. While the above embodiment was described with sliding the alert downwards in response to a downward swipe or flick, one of ordinary skill will appreciate that any other direction is also contemplated for both the direction of the sliding and the swipe directionality.

In some embodiments, device 500 can respond to detection of different dismissal inputs (such as data indicative of a user moving device 500 out of a viewing position versus a downward swipe on touchscreen 504) differently. For example, if device 500 detects data indicative of a user moving device 500 out of position for viewing, device 500 may assume that the user is no longer viewing touchscreen 504, and therefore may inactivate touchscreen 504 after dismissing the battery alert. In contrast, if device 500 detects a touch on touchscreen 504 followed by a movement of the touch (such as a downward swipe or flick), device 500 may assume that the user is still actively viewing touchscreen 504, and as shown in FIG. 8 device 500 may instead display a home screen 804 or another screen after dismissing the battery alert.

Displaying Additional Battery Information

Figure 9:
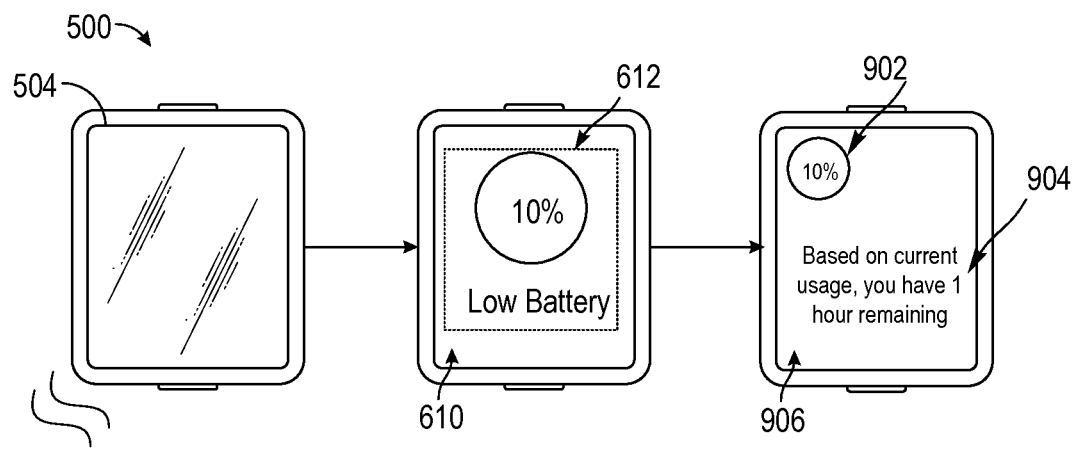
FIG. 9 illustrates exemplary user interfaces for managing battery levels.

Turning now to FIG. 9, as previously discussed with respect to FIG. 6, device 500 can display battery alert 612 in response to detecting a user input within a predetermined time interval following the haptic output caused by device 500. If, after displaying battery alert 612 device 500 does not detect a second user input within a second predetermined time interval, then device 500 can display screen 906 on touchscreen 504. The second user input may be data indicative of the user moving device 500 out of the viewing position by lowering it or rotating it, for example. Thus, if the user does not move device 500 after battery alert 612 is displayed, device 500 can display screen 906. This scenario may correspond to the case when the user, having viewed battery alert 612, wishes to view additional battery-related information and therefore does not dismiss battery alert 612. Instead, the user maintains device 500 in the viewing position and waits for additional battery-related information to be displayed on touchscreen 504 after the second predetermined time interval has elapsed. The second predetermined time interval may be in the range of 3-10 seconds, for example.

Screen 906 includes an indication of the threshold value 902, and may include an indication of an estimated amount of time 904 remaining before device 500 enters a low-power mode (such as described with respect to FIGS. 7A-C). In some embodiments, device 500 can determine the estimated amount of time remaining based on the current battery level and the average power consumption of device 500, on the discharge rate of the battery, or on other factors, for example.

Device 500 can also display screen 906 in response to detecting a contact with touchscreen 504 while battery alert 612 is displayed. In this scenario, the user may not wish to wait for the second predetermined time interval to elapse before viewing the additional battery-related information, and instead makes contact with touchscreen 504 to invoke immediate display of additional battery information. In response to detecting the contact with touchscreen 504, device 500 can display screen 906.

In some embodiments, the contact for invoking display of screen 906 is an upward swipe on touchscreen 504 while screen 610 is displayed. In other examples, the contact is a touch (e.g., a finger tap) at a location on touchscreen 504 that corresponds to battery alert 612. While the above embodiment was described in response to an upward swipe or flick, one of ordinary skill will appreciate that any other direction is also contemplated for the swipe directionality.

Low-Power Mode

As previously discussed with respect to FIGS. 7A-B, device 500 may automatically enter a low-power mode after detecting that the battery level is at or below a threshold value, or may enter a low-power mode in response to detecting a selection of an affordance (as in, for example, FIGS. 7C, 11, and 12). A low-power mode may be a mode in which device 500 operates to reduce power consumption and extend battery life. In some embodiments, while in low-power mode device 500 can display only a time of day and may include an indication that device 500 is in the low-power mode. Thus, in such embodiments, the ability to display the current time is preserved but other functionalities of device 500 may be disabled in order to provide a maximum duration of displaying the time.

In some embodiments, while operating in low-power mode, device 500 may respond to user inputs differently than when device 500 is operating in a normal power mode. For example, when device 500 is operating in a normal power mode, device 500 may respond to inputs normally, such as by displaying application icons, launching applications, performing various functions, etc. Such inputs may include inputs from one or more of input mechanisms (e.g., buttons) 506, 508, contacts on the touchscreen 504, or data received from accelerometers or gyroscopes, for example. In contrast, while operating in the low-power mode, device 500 may respond to these (same) inputs by displaying a single, particular output. In some embodiments, in response to user input while in low-power mode, device 500 may power on its display to only display the current time and/or an indication that it is operating in a low-power mode. In some embodiments device 500 may respond to user inputs differently depending on whether the battery level has dropped below a first battery threshold or a second battery threshold.

Figure 10A:
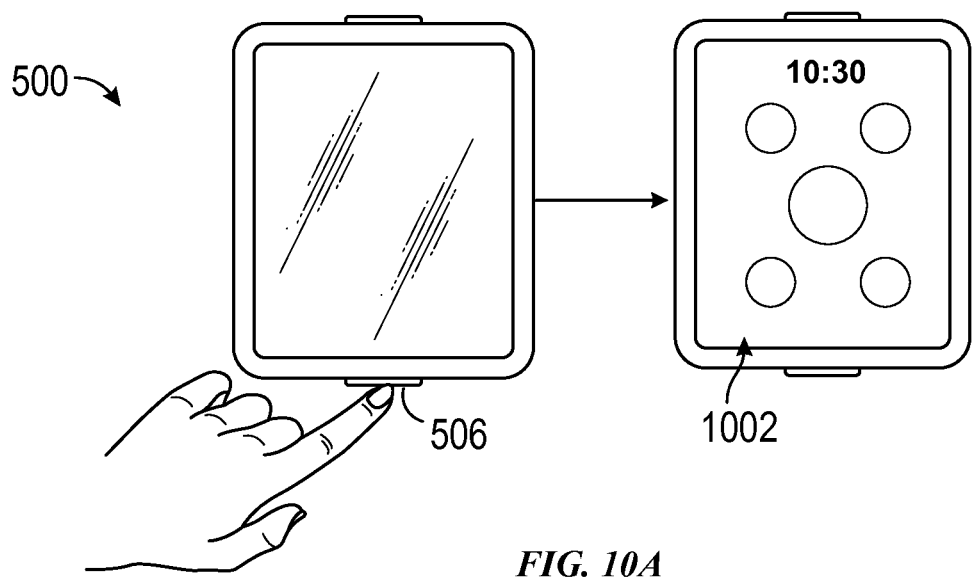
FIG. 10A illustrates exemplary user interfaces for managing battery levels.
Figure 10B:
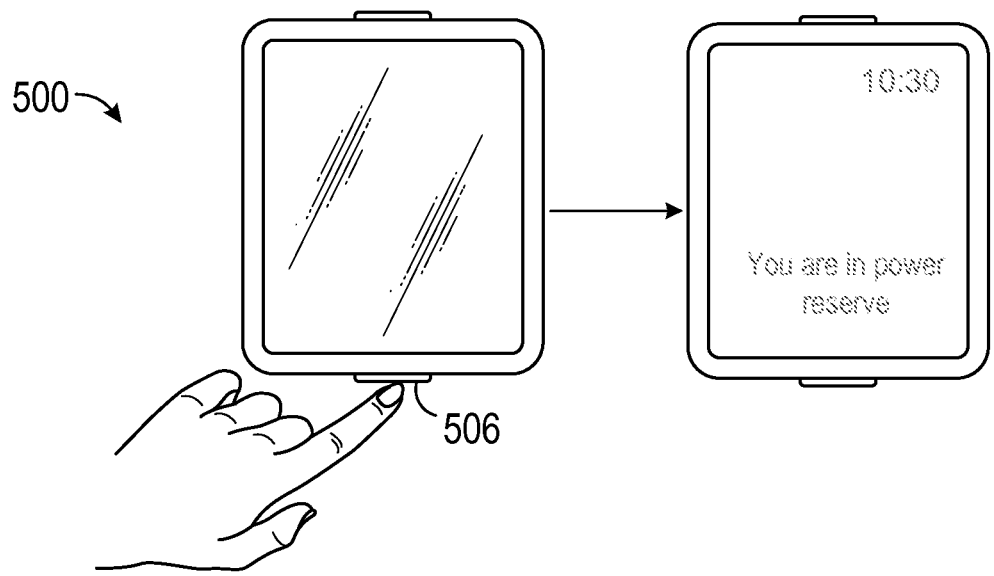
FIG. 10B illustrates exemplary user interfaces for managing battery levels.

FIG. 10A depicts an example of device 500 detecting a particular input (such as a depression) on input mechanism 506 while operating in a normal power mode, and responding to this particular input by displaying home screen 1002. FIG. 10B depicts an example of device 500 detecting the same particular input on input mechanism 506 while operating in a low-power mode, and responding to the particular input by displaying the current time and, optionally, an indication that device 500 is in low-power mode, rather than by displaying home screen 1002.

In some embodiments, device 500 may display the time in a first color before determining that the battery level is at or below a threshold value, and display the time in a second color different from the first color after determining that the battery level is at or below the threshold value. This technique may provide the user with a visual indication of whether device 500 is operating in a low-power mode, and may reduce the power consumption of device 500 if the power needed to display the time in the second color is lower than the power needed to display the time in the first color.

In some embodiments, device 500 may reduce the number of pixels used to display the time once device 500 enters the low-power mode. This reduction in pixels may reduce the power required to display the current time.

In some embodiments, device 500 may combine the above-described techniques for reducing the power needed to display the time while in a low-power mode; that is, device 500 may use different colors to display the time before and after determining that the battery level is at or below a threshold value and also use fewer pixels to display the time once device 500 enters the low-power mode.

In some embodiments, while device 500 is in a low-power mode, device 500 can vary the location of the time displayed on the display to prevent burn-in of the display while using the location of the displayed time to provide the user with quick visual cues regarding the current time of day. Notably, in such embodiments, the change in location of the displayed time provides more than a simple screen-saving mechanism that (for example) randomly changing display locations to prevent burn-in by "bouncing" the displayed text or affordances around the display. In such a simple screen-saving mechanism, the changing location of the displayed time is unrelated to the current time of day, and may frustrate or annoy the user by displaying the time in relatively unpredictable or non-intuitive locations on the display. In contrast, in some embodiments, device 500 may translate or animate the displayed time such that the time is displayed at locations ranging from the "top" of the display to the "bottom" of the display in proportion to the time of day. For example, a time of 00:01 (one minute after midnight on a 24-hour clock) may be displayed near the top of the display, and a time of 23:59 may be displayed near the bottom of the display. In this case, because the display location of the time is related to the time of day, the user can quickly estimate or discern the approximate time of day by glancing at the vertical placement of the displayed time. Similarly, device 500 may display the time at locations ranging from the "left" of the display to the "right" of the display in proportion to the time of day, or may display the time at locations ranging diagonally across the display in proportion to the time of day. A person of skill in the art will appreciate that there are many ways to determine display location based on the time of day. This display approach enhances the man-machine interaction because the machine can prevent burn-in of the display without frustrating the user as to the location of the displayed time.

Entering and Exiting Low-Power Mode

In some embodiments, device 500 can automatically enter the low-power mode in response to detecting that the battery level is at or below a threshold value, as described with respect to FIGS. 7A-B. In some embodiments, device 500 may cause a haptic output to alert the user that the device is entering the low-power mode, and then automatically enter the low-power mode.

In some embodiments, as described with respect to FIG. 7C, in response to detecting that the battery level is at or below the threshold value, device 500 may display screen 712 with confirmation affordance 716 prior to entering the low power mode, requesting that the user confirm that they wish to place device 500 in the low-power mode. In response to detecting a selection of the confirmation affordance 716, device 500 enters the low-power mode.

If device 500 enters the low-power mode after detecting that the battery level is at or below the threshold level (such as by entering the low-power mode automatically or in response to detecting a selection of the confirmation affordance, as described above), device 500 may subsequently automatically exit the low-power mode when the battery is recharged above a threshold value. The threshold value may be 10%, 15%, 20%, or 30% of a total battery level, for example.

In some embodiments, device 500 may provide a user interface that allows a user to manually place device 500 in the low-power mode. A user may wish to place device 500 in the low-power mode in cases where the user does not need most of the functions of device 500 but still wishes to have access to the timekeeping function of device 500 and/or wishes to extend the battery life of device 500, for example. For example, a user who is traveling without a battery charger may wish to reduce power use on device 500 by placing device 500 in the low-power mode during so that device 500 remains functional for a longer duration.

Figure 11A:
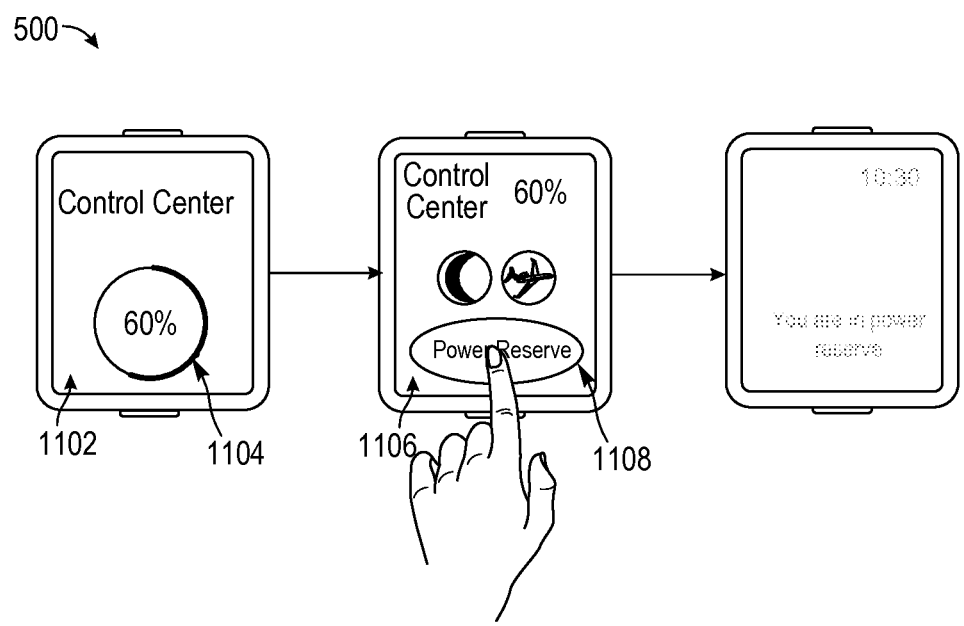
FIG. 11A illustrates exemplary user interfaces for managing battery levels.

FIG. 11A depicts a sequence of screens that device 500 can display to allow a user to manually place device 500 in a low-power mode, in accordance with some embodiments. In response to detecting a user input, device 500 may display screen 1102. The user input may be a touch on an icon or a swipe on touchscreen 504, for example. Screen 1102 includes an affordance 1104 indicating a current battery level. In this example, the current battery level is 60% of a total battery level. Affordance 1104 may include a numeric indicator of the current battery level and/or a visual gauge of the current battery level, in this case indicated by the percentage of the circle (approximately 60%) that is displayed as thickened.

In response to detecting a second user input, device 500 can display screen 1106, which includes an affordance 1108 for placing device 500 into the low-power mode. In response to detecting a selection of the affordance, device 500 can enter the low-power mode. In some embodiments, selection of affordance 1108 includes a touch or swipe on touchscreen 504 at a location corresponding to affordance 1108. In some embodiments, when device 500 enters the low-power mode, device 500 displays the time and an indication that device 500 is in the low-power mode.

Figure 11B:
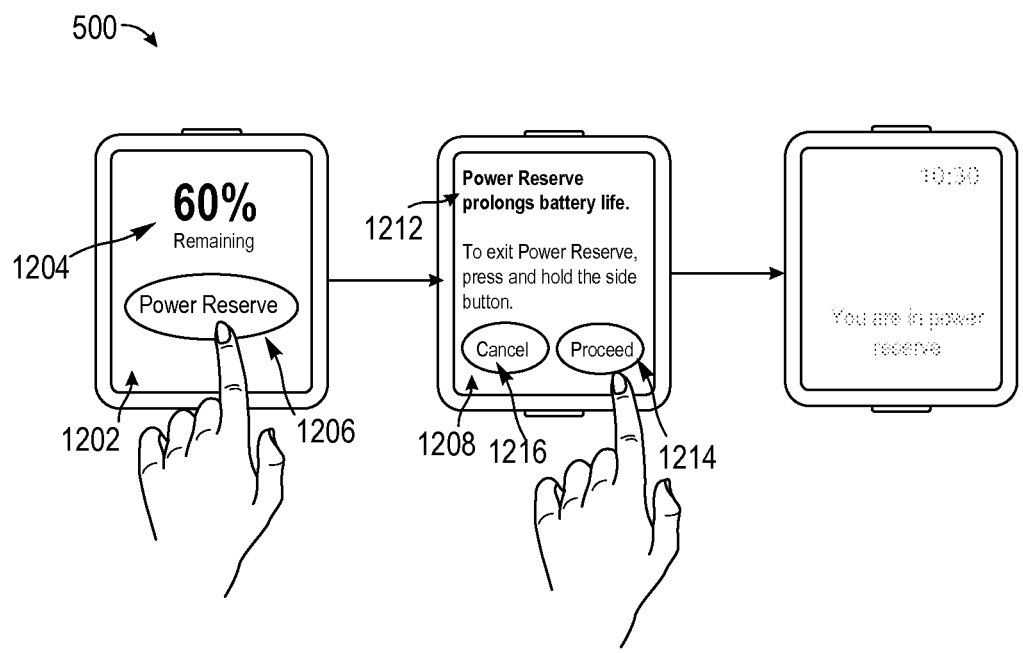
FIG. 11B illustrates exemplary user interfaces for managing battery levels.

FIG. 11B depicts a sequence of screens that device 500 can display to allow a user to manually place device 500 in a low-power mode, in accordance with some embodiments. In response to detecting a user input, device 500 may display screen 1202. In some embodiments, the user input may be a touch on an icon on touchscreen 504. For example, the input is swipe upwards from the bottom edge of touchscreen 504, or a left-to-right or right-to-left swipe from an edge of the touch screen. Screen 1202 includes an affordance 1204 indicating a current battery level. In this example, the current battery level is 60% of a total battery level. Screen 1202 also includes an affordance 1206 for placing device 500 into the low-power mode.

In some embodiments, in response to detecting a selection of affordance 1206, device 500 can optionally display screen 1208. The selection of affordance 1206 may be a touch or swipe on touchscreen 504 at a location corresponding to affordance 1206, for example. Screen 1208 includes an affordance 1214 for confirming that device 500 should enter the low-power mode, and an affordance 1216 for foregoing placement into low-power mode. In response to detecting a selection of affordance 1214, device 500 can enter the low-power mode. The selection of affordance 1214 may be a touch or swipe on touchscreen 504 at a location corresponding to affordance 1214, for example. In response to detecting a selection of affordance 1216, device 500 returns to displaying screen 1202. The selection of affordance 1216 is a touch or swipe on touchscreen 504 at a location corresponding to affordance 1216, for example. In some embodiments, device 500 enters low-power mode in response to selection of affordance 1206 without the display of screen 1208.

Figure 12A:
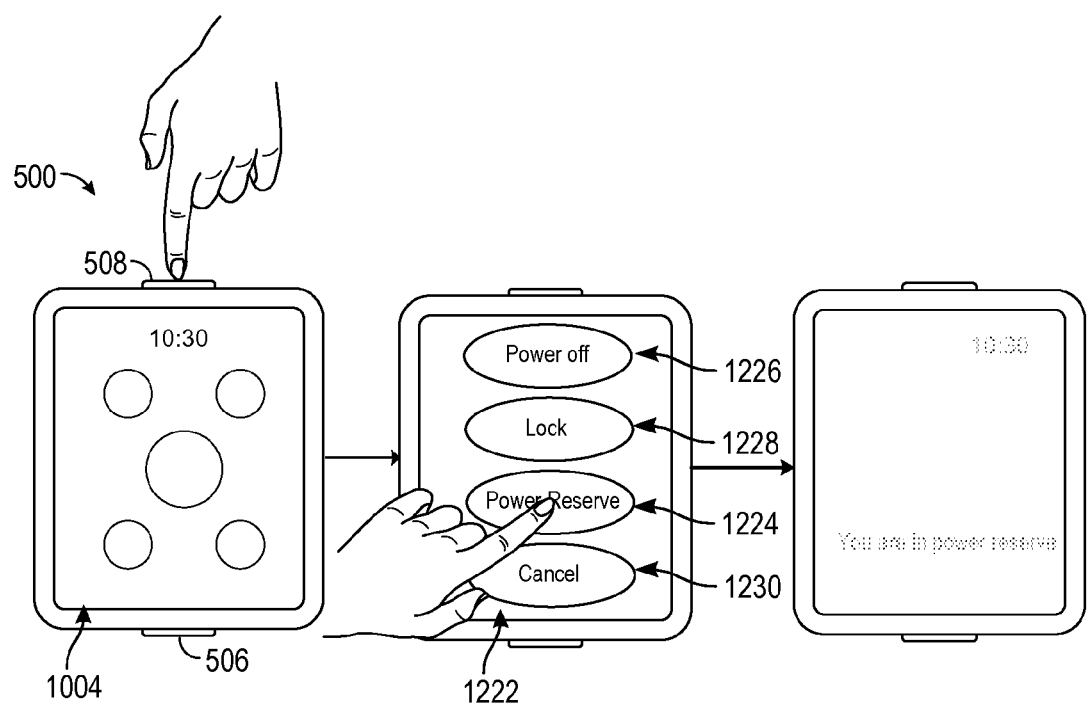
FIG. 12A illustrates exemplary user interfaces for managing battery levels.

FIG. 12A depicts another sequence of screens that device 500 can display to allow a user to manually place device 500 in a low-power mode. In response to detecting a user input, device 500 may display screen 1222. In some embodiments, the user input may be a depression of input mechanism 508 or 506. Screen 1222 includes an affordance 1224 for placing device 500 into the low-power mode. In response to detecting a selection of affordance 1224, device 500 can enter the low-power mode. In some embodiments, selection of affordance 1224 includes a touch or swipe on touchscreen 504 at a location corresponding to affordance 1224. In some embodiments, when device 500 enters the low-power mode, device 500 displays the time and an indication that device 500 is in the low-power mode.

In some embodiments, affordance 1224 for placing device 500 into low-power mode is disabled on screen 1222 when device 500 is charging. For example, when device 500 is connected to an external power source, affordance 1224 is greyed out on screen 1222 and cannot be selected.

As another example, when device 500 is connected to a power source, affordance 1224 is replaced with a different affordance or visual object indicating that the device is charging. In both examples, the user cannot manually place device 500 into the low-power mode from screen 1222.

In some embodiments, a visual object may be displayed responsive to the electronic device determining that the device is connected to a power source, and optionally may be displayed, at least in part, as a symbol (e.g., lightning bolt) indicating that the battery is connected to the power source.

In some embodiments, the visual object may indicate a charge level of the battery. The charge level may be represented using a numerical percentage and/or may be represented using a ring-shaped visual object having clockwise (or counterclockwise) animation. In some instances, portions of ring-shaped visual objects may be selectively displayed such that the amount of a ring displayed corresponds to the level at which the battery is charged. By way of example, a battery having 50% charge may be displayed as a semi-circle and a battery having a 75% charge may be displayed as a three-quarter circle.

In some embodiments, the visual object may further be displayed using one or more colors. For example, a color by which the visual object is displayed may be based on a charge threshold. If the percentage at which the battery is charged is greater than a threshold, the visual object may be displayed with a first color (e.g., green) and if the percentage at which the battery is charged is equal to or less than a threshold, the visual object may be displayed with a second color (e.g., red).

Referring back to FIG. 12, in some embodiments, screen 1222 also includes a power off affordance 1226 for powering off device 500, a lock affordance 1228 for locking and/or unlocking device 500, and a cancel affordance 1230 for canceling a selection and, optionally, returning to screen 1004.

In some embodiments, the availability of lock affordance 1228 on screen 1222 is based on one or more settings of device 500. An exemplary device setting that affects the display of affordance 1228 is an accessibility feature that improves the functioning of device 500 when worn on a prosthetic limb (or other usage scenarios where contact with the device' user's skin is insufficient or undetectable). If device 500 is set to automatically detect whether it is being worn by a human user, lock affordance 1228 is not displayed on screen 1222. In contrast, if device 500 is set to bypass detection of whether it is being worn by a human user, lock affordance 1228 is displayed on screen 1222 to permit manual locking of the device.

If lock affordance 1228 is displayed on screen 1222, device 500 allows a user to manually lock the device by selecting lock affordance 1228. As shown in FIG. 12A, when device 500 is unlocked, screen 1222 includes lock affordance 1228 for locking device 500. In response to detecting a selection of lock affordance 1228, device 500 becomes locked. In some embodiments, selection of lock affordance 1228 includes a touch or swipe on touchscreen 504 at a location corresponding to lock affordance 1228. In some embodiments, lock affordance 1228 includes a slider switch, and selection of lock affordance 1228 includes a touch or swipe on touchscreen 504 to toggle the switch. In some embodiments, locked device 500 displays screen 1006 to indicate that the device is locked, as shown in FIG. 12B.

Figure 12B:
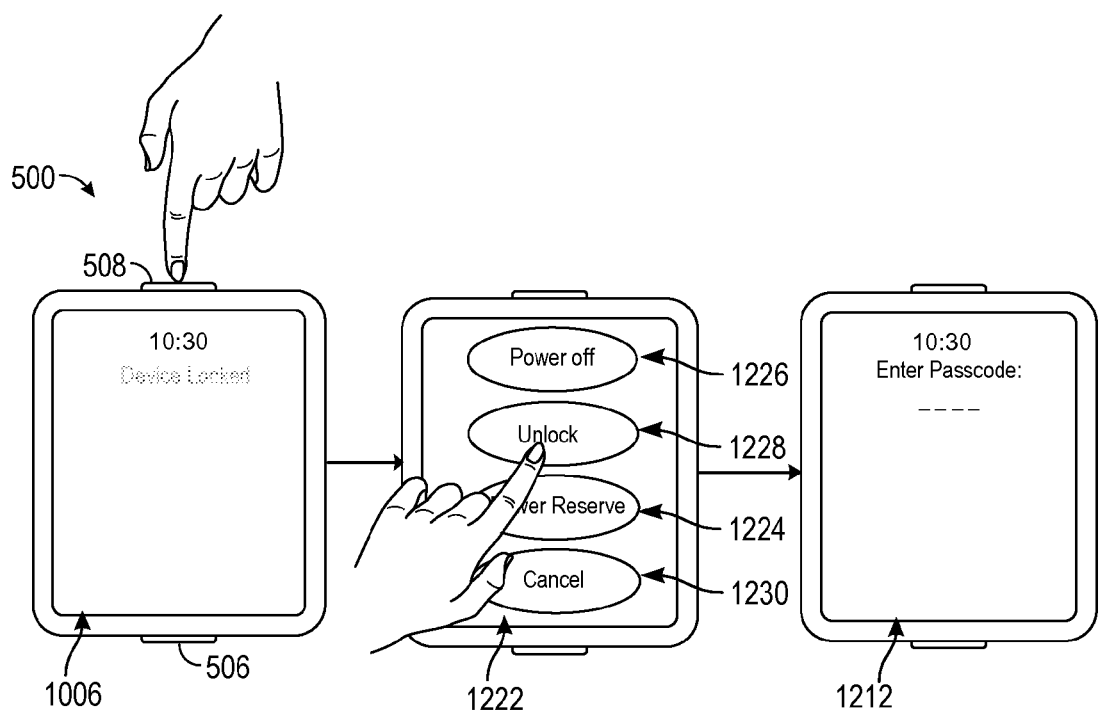
FIG. 12B illustrates exemplary user interfaces for managing battery levels.

FIG. 12B depicts a sequence of screens that device 500 can display to allow a user to manually unlock device 500. When device 500 is locked, a user may access screen 1222 by activating button 508, for example. Screen 1222 includes affordance 1228 for unlocking device 500. Affordance 1228 optionally indicates the current locked state of device 500. For example, affordance 1228 can have associated verbiage "locked." For example, affordance 1228 can be displayed as a slider switch in its locked position. In response to detecting a selection of affordance 1228, device 500 initiates an unlock process. In some embodiments, when device 500 initiates the unlock process, device 500 requests entry of a passcode, as shown in screen 1212.

In some embodiments, device 500 may allow a user to place device 500 in a low-power mode without using a user interface or viewing touchscreen 504. For example, device 500 may enter a low-power mode in response to detecting user inputs on one or more of the input mechanisms. As discussed with respect to FIGS. 5A-B, in some embodiments, device 500 includes two input mechanisms (such as buttons) 506, 508. In these embodiments, in response to detecting that the user has depressed both of the input mechanisms 506, 508 simultaneously or nearly simultaneously, device 500 can enter the low-power mode. In some embodiments, device 500 can enter the low-power mode in response to detecting a depression or rotation of only one of the input mechanisms, or in response to detecting a different sequence or combination of depressions or rotations of the input mechanisms.

If device 500 is in the low-power mode and the battery level is above a minimum battery level, device 500 may allow a user to cause device 500 to manually exit low-power mode without recharging the battery. In some embodiments, device 500 can exit low-power mode in response to detecting a depression or rotation of one or more input mechanisms 506, 508. In some embodiments, device 500 may determine if the depression or rotation of the one or more input mechanisms exceeds a threshold time duration. If the duration exceeds the threshold, device 500 may exit the low-power mode. Otherwise, device 500 may remain in the low-power mode. Thus, in some examples, a user may cause device 500 to manually exit the low-power mode by pressing and holding one or more buttons on device 500, for example.

If the battery of device 500 is at or below a minimum battery level—such as approximately 0% of the total battery level, for example—device 500 may ignore a user input requesting to exit the low-power mode, and may remain in low-power mode until the battery is recharged to a minimum battery level. After the battery has been recharged to at or above the minimum battery level, device 500 may automatically exit the low-power mode, or may exit the low-power mode in response to detecting a user input as described above.

Processes for Displaying and Managing Battery Levels

Figure 13:
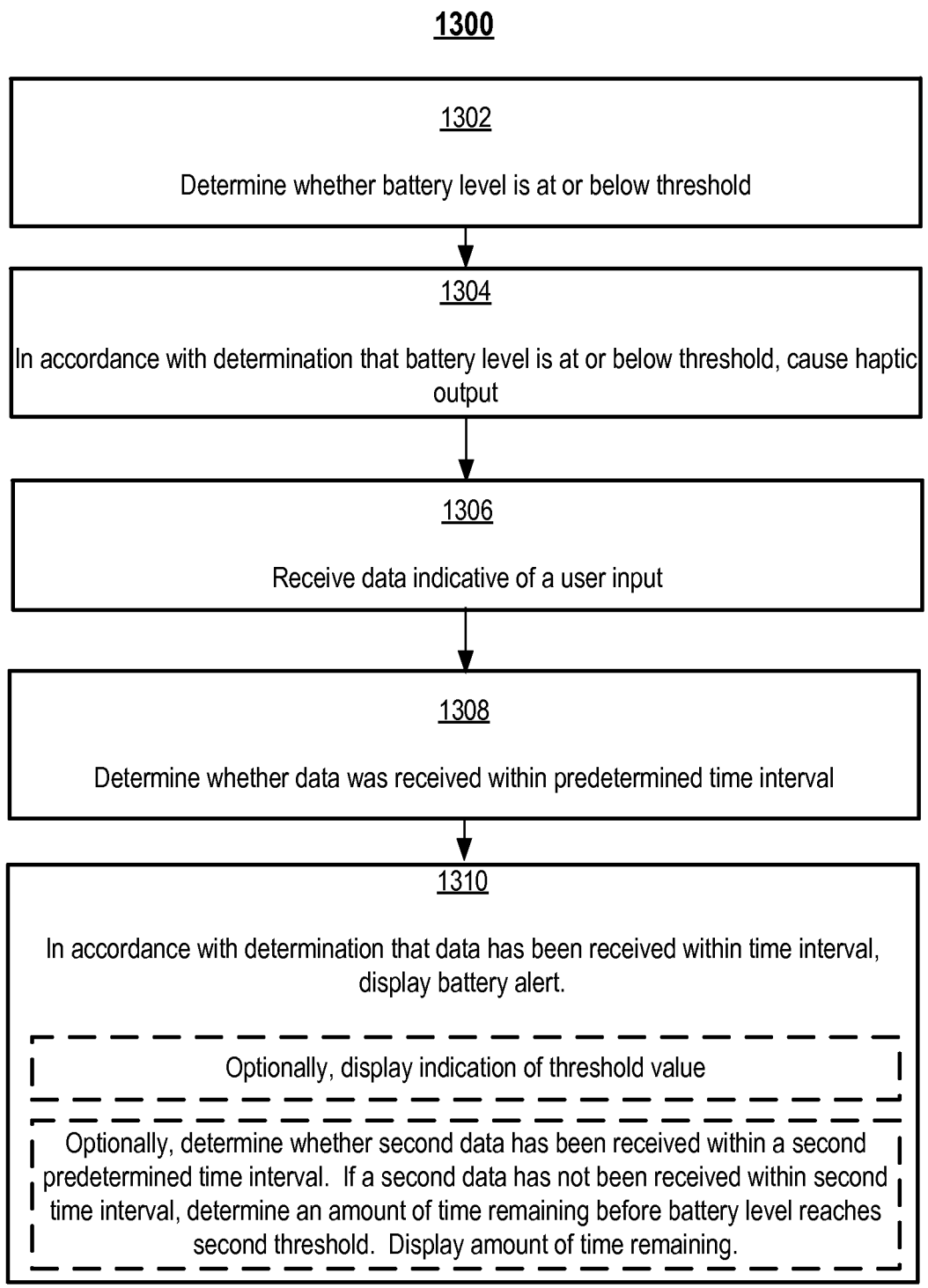
FIG. 13 is a flow diagram illustrating an exemplary process for displaying a user interface for managing battery levels.

FIG. 13 is a flow diagram illustrating process 1300 for managing a battery power level. Process 1300 may be performed at an electronic device with a touch-sensitive display screen, such as device 100, 300 and/or 500 (e.g., FIGS. 1, 3, and 5). At block 1302, the device determines whether the battery level is at or below a threshold level. At block 1304, in accordance with a determination that the battery level is at or below the threshold, device 500 causes a haptic mechanism (e.g., haptic mechanism 542) to issue a haptic output. At block 1306, the device receives data indicative of a user input. At block 1308, the device determines whether the data was received within a predetermined time interval after the haptic output. In accordance with a determination that the data was received within the predetermined time interval, at block 1310, the device displays a battery alert. The displayed battery alert may be drawn from the examples depicted in FIG. 6, 7A-C, 8, or 9, for example. Optionally, the battery level is determined while the display is inactive. Optionally, the device determines whether second data has been received within a second predetermined time interval. In accordance with a determination that the second data has not been received within the second time interval, the device determines an estimated amount of time remaining before the battery level reaches a second threshold. The device displays the amount of time remaining. The time remaining may be displayed as depicted in FIG. 9, for example.

Note that details of the processes described above with respect to process 1300 (e.g., FIGS. 13 and 6) are also applicable in an analogous manner to the other processes described herein. For example, processes 1400 and 1500 may include one or more of the characteristics of the various processes described above with reference to process 1300. For brevity, these details are not repeated in the descriptions of the other processes. The various methods and techniques described above with reference to method 1300 may be optionally implemented as one or more hardware units, such as those described with regard to FIG. 16.

FIG. 14 is a flow diagram illustrating process 1400 for managing a battery power level. Process 1400 may be performed at an electronic device with a touch-sensitive display, such as device 100, 300 and/or 500 (e.g., FIGS. 1, 3, and 5). At block 1402, the device determines whether the battery level is at or below a threshold level. At block 1404, in accordance with a determination that the battery level is at or below the threshold, the device enters a low-power mode. The low-power mode is characterized by the device producing the same particular output in response to an input at any of a touch-sensitive display, button, or rotatable input mechanism, wherein the particular output is different from an output produced by the device in response to the same input at any of the touch-sensitive display, button, or rotatable input mechanism while the device is in a normal power mode. One example of such behavior is depicted in FIGS. 10A-B.

Optionally, entering the low-power mode comprises displaying a confirmation affordance for confirming that the user wishes to enter the low-power mode, and, in response to detecting a selection of the confirmation affordance, entering the low-power mode.

Optionally, the particular output produced in low-power mode includes the current time. Optionally, the particular output produced in low-power mode includes an indication of the battery level. Optionally, while in the low-power mode, the device also produces the particular output in response to receiving data from an accelerometer and/or gyroscope that exceeds a predetermined value.

Note that details of the processes described above with respect to process 1400 (e.g., FIGS. 14 and 7A-C) are also applicable in an analogous manner to the other processes described herein. For example, processes 1300 and 1500 may include one or more of the characteristics of the various processes described above with reference to process 1400. For brevity, these details are not repeated in the descriptions of the other processes. The various methods and techniques described above with reference to method 1400 may be optionally implemented as one or more units, such as those described with regard to FIG. 17.

Figure 15:
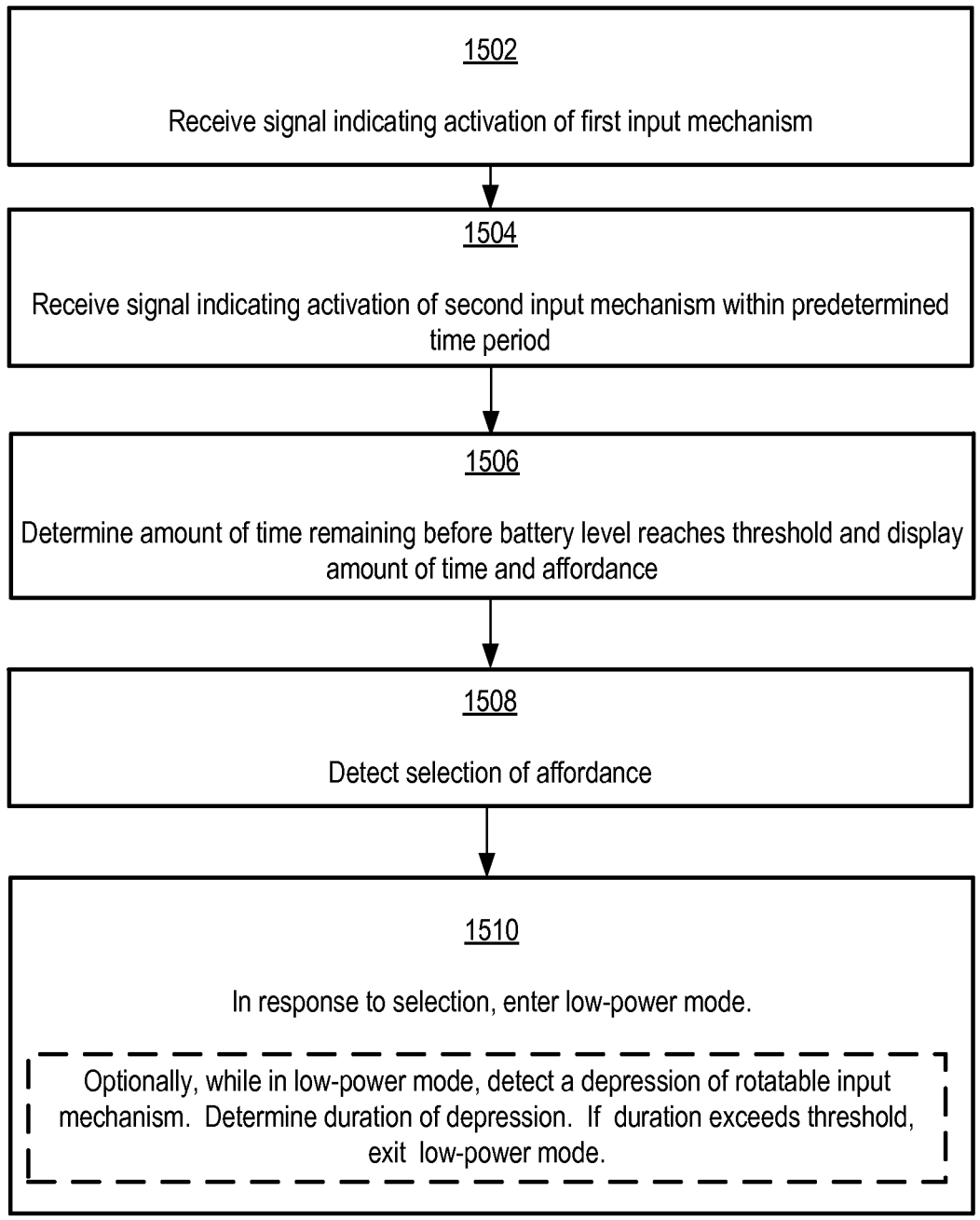
FIG. 15 is a flow diagram illustrating an exemplary process for displaying a user interface for managing battery levels.

FIG. 15 is a flow diagram illustrating process 1500 for managing a battery power level. Process 1500 may be performed at an electronic device with a touch-sensitive display, such as device 100, 300 and/or 500 (e.g., FIGS. 1, 3, and 5). At block 1502, the device receives first data indicating activation of a first input mechanism. At block 1504, the device receives second data indicating activation of a second input mechanism, where the second data is received within a predetermined time period after receiving the first data. At block 1506, in response to receiving the first data and second data, the device determines the amount of time remaining before the battery level reaches the threshold and displays the amount of time remaining and an affordance. At block 1508, the device detects a selection of the affordance. In response to detecting the selection, at block 1510, the device enters a low-power mode. Optionally, while in the low-power mode, the device receives data indicating a depression of a rotatable input mechanism. The device determines the duration of the depression. If the duration exceeds a threshold, the device exits the low-power mode.

Note that details of the processes described above with respect to process 1500 (e.g., FIG. 15) are also applicable in an analogous manner to the other processes described herein. For example, processes 1300 and 1400 may include one or more of the characteristics of the various processes described above with reference to process 1500. For brevity, these details are not repeated in the descriptions of the other processes. The various methods and techniques described above with reference to method 1500 may be optionally implemented as one or more units, such as those described with regard to FIG. 18.

Figure 16:
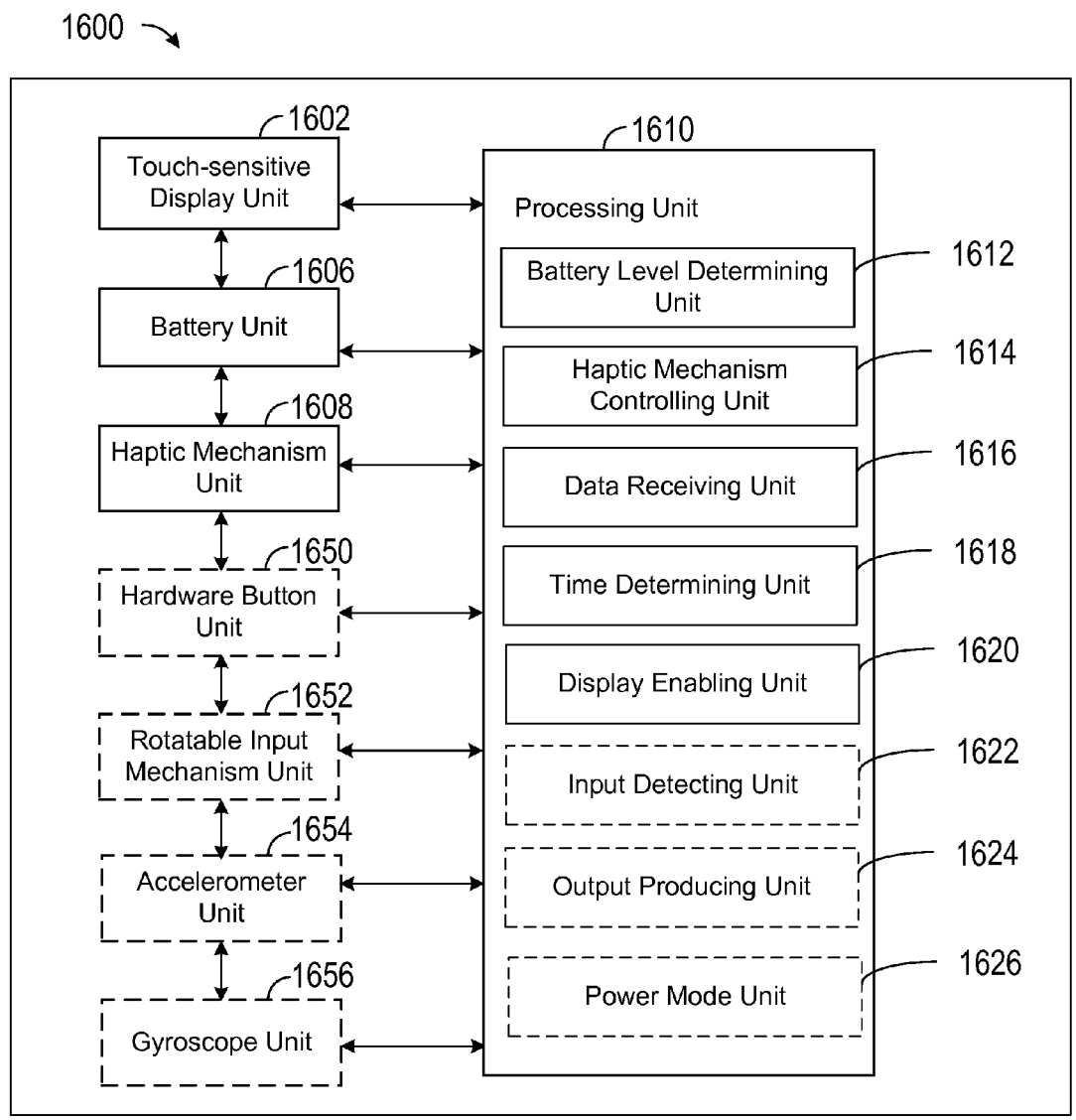
FIG. 16 is a functional block diagram of an electronic device configured to display a user interface in accordance with some embodiments.

In accordance with some embodiments, FIG. 16 shows an exemplary functional block diagram of an electronic device 1600 configured in accordance with the principles of the various described embodiments. In accordance with some embodiments, the functional blocks of electronic device 1600 are configured to perform the techniques described above. The functional blocks of the device 1600 are, optionally, implemented by hardware, software, or a combination of hardware and software to carry out the principles of the various described examples. It is understood by persons of skill in the art that the functional blocks described in FIG. 16 are, optionally, combined or separated into sub-blocks to implement the principles of the various described examples. Therefore, the description herein optionally supports any possible combination or separation or further definition of the functional blocks described herein.

As shown in FIG. 16, an electronic device 1600 includes a touch-sensitive display unit 1602, a battery unit 1606, a haptic mechanism unit 1608, and a processing unit 1610 coupled to touch-sensitive display unit 1602, battery unit 1606, and haptic mechanism unit 1608. Processing unit 1610 includes a battery level determining unit 1612, a haptic mechanism controlling unit 1614, a data receiving unit 1616, a time determining unit 1618, and a display enabling unit 1620. Optionally, electronic device 1600 includes a hardware button unit 1650, a rotatable input mechanism unit 1652, an accelerometer unit 1654, and a gyroscope unit 1656, all of which are coupled to processing unit 1610. Optionally, processing unit 1610 includes an input detecting unit 1622, an output producing unit 1624, and a power mode unit 1626.

Processing unit 1610 is configured to: determine (e.g., with battery level determining unit 1612) a battery level of battery unit 1606; in accordance with a determination that the battery level is at or below a first threshold value, cause haptic mechanism unit 1608 (e.g., with haptic mechanism controlling unit 1614) to issue a haptic output; receive (e.g., with data receiving unit 1616) data indicative of a user input; determine (e.g., with time determining unit 1618) whether the data has been received within a predetermined time interval after the haptic output; and in accordance with a determination that the data has been received within the predetermined time interval, enable (e.g., with display enabling unit 1620) a display of a battery alert on touch-sensitive display unit 1602.

In some embodiments, processing unit 1610 is further configured to determine (e.g., with battery level determining unit 1612) the battery level while touch-sensitive display unit 1602 is inactive.

In some embodiments, the data indicative of a user input is a first data and the user input is a first user input, and processing unit 1610 is further configured to: after enabling the display of the battery alert, receive (e.g., with data receiving unit 1616) second data indicative of a second user input; determine (e.g., with time determining unit 1618) whether the second data indicative of the second user input has been received within a second time interval after enabling the display of the battery alert; in accordance with a determination that the second data has been received within the second time interval, remove (e.g., with display enabling unit 1620) the display of the battery alert from touch-sensitive display unit 1602; and in accordance with a determination that the second data has not been received within the second time interval: determine (e.g., with time determining unit 1618) an amount of time remaining before the battery level reaches a second threshold level, and enable (e.g., with display enabling unit 1620) a display of the amount of time remaining on touch-sensitive display unit 1602.

In some embodiments, the second user input corresponds to a movement of electronic device 1600.

In some embodiments, processing unit 1610 is further configured to: while touch-sensitive display unit 1602 is displaying the battery alert, detect (e.g., with input detecting unit 1622) a third user input; and in response to detecting the third user input: determine (e.g., with time determining unit 1618) an amount of time remaining before the battery level reaches a second threshold level, and enable (e.g., with display enabling unit 1620) a display of the amount of time remaining on touch-sensitive display unit 1602.

In some embodiments, the third user input is a contact on the touch-sensitive display unit 1602.

In some embodiments, processing unit 1610 is further configured to: detect (e.g. input detecting unit 1622) a swipe on touch-sensitive display unit 1602 while touch-sensitive display unit 1602 is displaying the battery alert; and in response to detecting the swipe, remove (e.g. display enabling unit 1620) the display of the battery alert from touch-sensitive display unit 1602.

In some embodiments, the swipe is a substantially downward swipe.

In some embodiments, processing unit 1610 is further configured to: remove the display of the battery alert by enabling (e.g., with display enabling unit 1620) a display of an animation that slides the battery alert off-screen in the direction of the swipe.

In some embodiments, processing unit 1610 is further configured to: remove the display of the battery alert from touch-sensitive display unit 1602 by causing (e.g., with display enabling unit 1620) a display of touch-sensitive display unit 1602 to become inactive.

In some embodiments, processing unit 1610 is further configured to: enable the display of the battery alert by enabling (e.g., with display enabling unit 1620) a display of an animation that slides the battery alert upwards from the bottom of touch-sensitive display unit 1602.

In some embodiments, processing unit 1610 is further configured to: while in a normal power mode, produce (e.g., with an output producing unit 1624) a first output responsive to input at touch-sensitive display unit 1602, a second output responsive to input at least one hardware button unit 1650, and a third output responsive to input at rotatable input mechanism unit 1652; and in accordance with the determination that the battery level is at or below the first threshold value: enter (e.g., with a power mode unit 1626) a low-power mode, the low-power mode characterized in that a fourth output is produced responsive to input at any of touch-sensitive display unit 1602, the at least one hardware button unit 1650, or rotatable input mechanism unit 1652.

In some embodiments, the fourth output is different from the first output, the second output, and the third output.

In some embodiments, the fourth output comprises a display of the current time on touch-sensitive display unit 1602.

In some embodiments, the fourth output comprises a display of an indication of the battery level of battery unit 1606 on touch-sensitive display unit 1602.

In some embodiments, processing unit 1610 is further configured to: while in the normal power mode: receive (e.g., with data receiving unit 1616) third data from at least one of accelerometer unit 1654 and gyroscope unit 1656, and in accordance with a determination that the third data of the at least one of accelerometer unit 1654 and gyroscope unit 1656 exceeds a predetermined value, produce (e.g., with output producing unit 1624) a fifth output.

In some embodiments, processing unit 1610 is further configured to: while in the low-power mode: receive (e.g., with data receiving unit 1616) the third data from the at least one of accelerometer unit 1654 and gyroscope unit 1656, and in accordance with a determination that the third data of the at least one of accelerometer unit 1654 and gyroscope unit 1656 exceeds the predetermined value, produce (e.g., with output producing unit 1624) the fourth output.

The operations described above with reference to FIG. 13 are, optionally, implemented by components depicted in FIGS. 1A-1B or FIG. 16. For example, battery level determining operation 1302, haptic output causing operation 1304, and data receiving operation 1306 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 17:
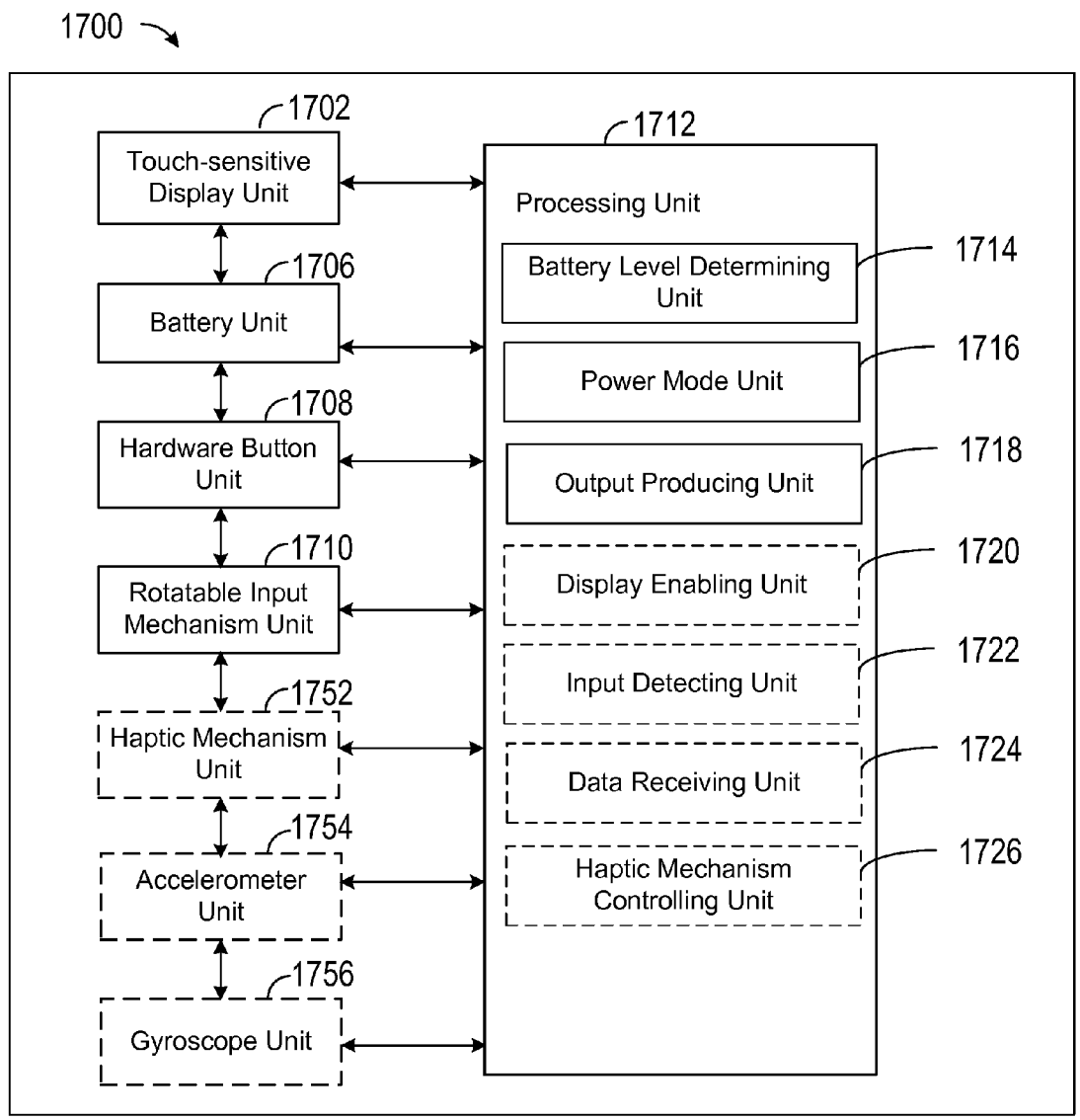
FIG. 17 is a functional block diagram of an electronic device configured to display a user interface in accordance with some embodiments.

In accordance with some embodiments, FIG. 17 shows an exemplary functional block diagram of an electronic device 1700 configured in accordance with the principles of the various described embodiments. In accordance with some embodiments, the functional blocks of electronic device 1700 are configured to perform the techniques described above. The functional blocks of the device 1700 are, optionally, implemented by hardware, software, or a combination of hardware and software to carry out the principles of the various described examples. It is understood by persons of skill in the art that the functional blocks described in FIG. 17 are, optionally, combined or separated into sub-blocks to implement the principles of the various described examples. Therefore, the description herein optionally supports any possible combination or separation or further definition of the functional blocks described herein.

As shown in FIG. 17, an electronic device 1700 includes a touch-sensitive display unit 1702, a battery unit 1706, a hardware button unit 1708, a rotatable input mechanism unit 1710, and a processing unit 1712 coupled to touch-sensitive display unit 1702, battery unit 1706, hardware button unit 1708, and rotatable input mechanism unit 1710. Processing unit 1712 includes a battery level determining unit 1714, a power mode unit 1716, and an output producing unit 1718. Optionally, electronic device 1700 includes a haptic mechanism unit 1752, an accelerometer unit 1754, and a gyroscope unit 1756, all of which are coupled to processing unit 1712. Optionally, processing unit 1712 includes a display enabling unit 1720, an input detecting unit 1722, a data receiving unit 1724, and a haptic mechanism controlling unit 1726.

Processing unit 1712 is configured to: while in a normal power mode, produce (e.g., with output producing unit 1718) a first output responsive to input at touch-sensitive display unit 1702, a second output responsive to input at the at least one hardware button unit 1708, and a third output responsive to input at rotatable input mechanism unit 1710; determine (e.g., with battery level determining unit 1714) a battery level of battery unit 1706; and in accordance with a determination that the battery level is at or below a first threshold value: enter (e.g., with power mode unit 1716) a low-power mode, the low-power mode characterized in that a fourth output is produced responsive to input at any of touch-sensitive display unit 1702, the at least one hardware button unit 1708, or rotatable input mechanism unit 1710.

In some embodiments, entering the low-power mode comprises: enabling display (e.g., with display enabling unit 1720) of a confirmation affordance for entering the low-power mode; detecting (e.g., with input detecting unit 1722) a selection of the confirmation affordance; and in response to detecting the selection, entering (e.g., with power mode unit 1716) the low-power mode.

In some embodiments, the fourth output is different than the first output, the second output and the third output.

In some embodiments, the fourth output comprises display of the current time on touch-sensitive display unit 1702.

In some embodiments, the fourth output comprises display of an indication of the battery level of battery unit 1706 on touch-sensitive display unit 1702.

In some embodiments, electronic device 1700 further comprises at least one of accelerometer unit 1754 and gyroscope unit 1756. Processing unit 1712 is further coupled to the at least one of accelerometer unit 1754 and gyroscope unit 1756.

In some embodiments, processing unit 1712 is further configured to: while in the normal power mode: receive (e.g., with data receiving unit 1724) first data from the at least one of accelerometer unit 1754 and gyroscope unit 1756; and in accordance with a determination that the first data from the at least one of accelerometer unit 1754 and gyroscope unit 1756 exceeds a predetermined value, produce (e.g., with output producing unit 1718) a fifth output.

In some embodiments, processing unit 1712 is further configured to: while in the low-power mode: receive second data of the at least one of accelerometer unit 1754 and gyroscope unit 1756; in accordance with a determination that the second data from the at least one of the accelerometer unit and the gyroscope unit exceeds the predetermined value, produce (e.g., with output producing unit 1718) the fourth output.

In some embodiments, electronic device 1700 further comprises haptic mechanism unit 1752. Processing unit 1712 is coupled to haptic mechanism unit 1752, and is further configured to: in accordance with the determination that the battery level is at or below the first threshold value, cause (e.g., with haptic mechanism controlling unit 1726) haptic mechanism unit 1752 to issue a haptic output on electronic device 1700.

In some embodiments, processing unit 1712 is further configured to: in accordance with the determination that the battery level is at or below the first threshold value, enable (e.g., with display enabling unit 1720) display of an indication that electronic device 1700 is in a low-power mode.

In some embodiments, processing unit 1712 is further configured to: in accordance with a determination that the battery level is above the first threshold value, enable (e.g., with display enabling unit 1720) display of the time in a first color; and in accordance with a determination that the battery level is at or below the first threshold value, enable (e.g., with display enabling unit 1720) display of the time in a second color different from the first color.

In some embodiments, the power needed to enable display of the time in the second color is lower than the power needed to enable display of the time in the first color.

In some embodiments, enabling display of the time in the second color instead of the first color comprises reducing (e.g., with display enabling unit 1720) a number of pixels of touch-sensitive display unit 1702 used to display the time.

The operations described above with reference to FIG. 14 are, optionally, implemented by components depicted in FIGS. 1A-1B or FIG. 17. For example, battery level determining operation 1402 and low-power mode entering operation 1404 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 18:
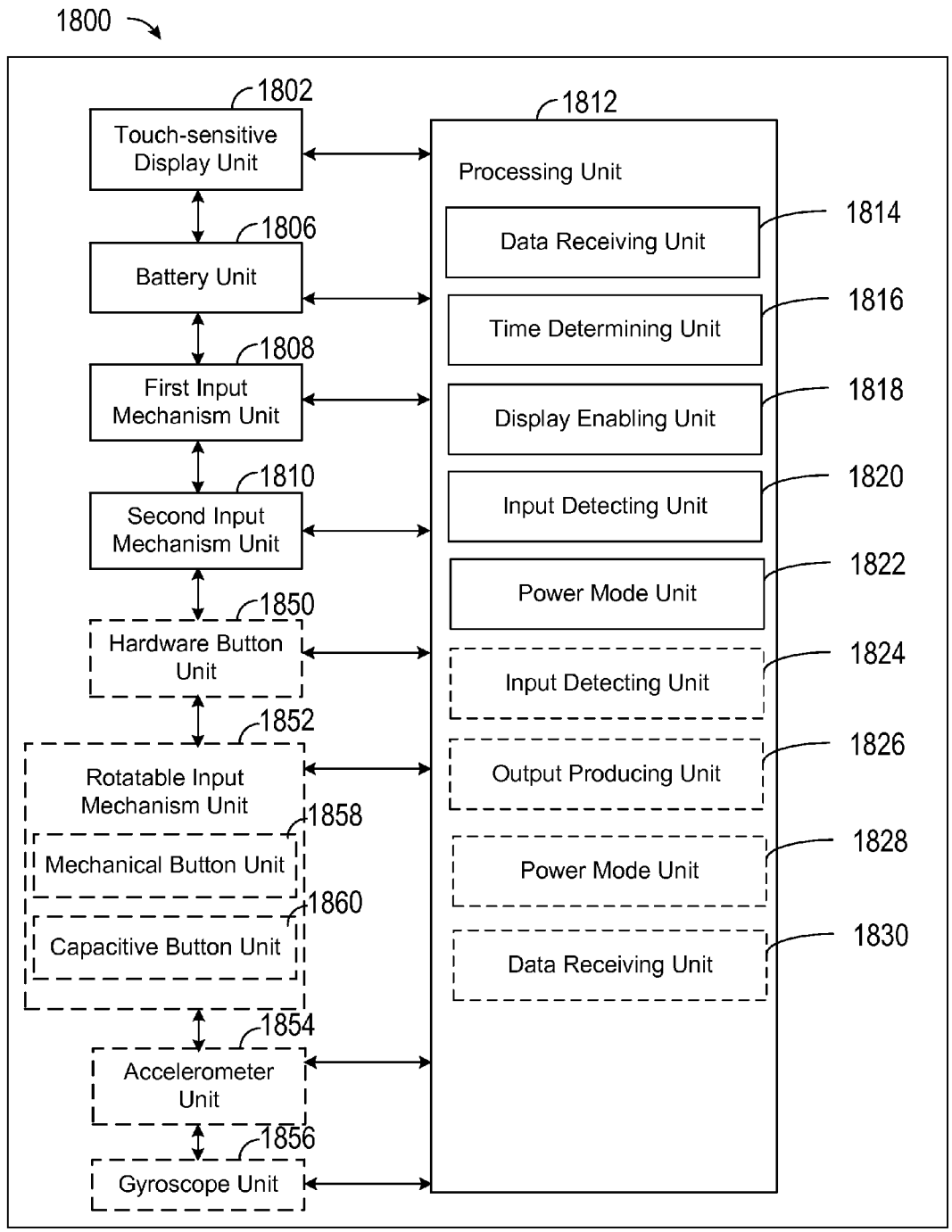
FIG. 18 is a functional block diagram of an electronic device configured to display a user interface in accordance with some embodiments.

In accordance with some embodiments, FIG. 18 shows an exemplary functional block diagram of an electronic device 1800 configured in accordance with the principles of the various described embodiments. In accordance with some embodiments, the functional blocks of electronic device 1800 are configured to perform the techniques described above. The functional blocks of the device 1800 are, optionally, implemented by hardware, software, or a combination of hardware and software to carry out the principles of the various described examples. It is understood by persons of skill in the art that the functional blocks described in FIG. 18 are, optionally, combined or separated into sub-blocks to implement the principles of the various described examples. Therefore, the description herein optionally supports any possible combination or separation or further definition of the functional blocks described herein.

As shown in FIG. 18, an electronic device 1800 includes a touch-sensitive display unit 1802, a battery unit 1806, at least two input mechanisms (e.g. a first mechanism unit 1808 and a second mechanism unit 1810), and a processing unit 1812 coupled to touch-sensitive display unit 1802, battery unit 1806, and the at least two input mechanisms (e.g. first mechanism unit 1808 and second mechanism unit 1810). Processing unit 1812 includes a data receiving unit 1814, a time-determining unit 1816, a display enabling unit 1818, an input detecting unit 1820, and a power mode unit 1822. Optionally, electronic device 1800 includes at least one hardware button unit 1850, a rotatable input mechanism unit 1852, an accelerometer unit 1854, and a gyroscope unit 1856, all of which are coupled to processing unit 1812. Optionally, rotatable input mechanism unit 1852 comprises a mechanical button unit 1858. Optionally, rotatable input mechanism unit 1852 comprises a capacitive button unit 1860. Optionally, processing unit 1812 includes an input detecting unit 1824, an output producing unit 1826, a power mode unit 1828, and a data receiving unit 1830.

Processing unit 1812 is configured to: receive (e.g., with data receiving unit 1814) first data indicative of an activation of first input mechanism unit 1808; receive (e.g., with data receiving unit 1814) second data indicative of an activation of second input mechanism unit 1810, wherein the second data is received within a predetermined elapsed time period from receiving the first data; and in response to receiving the first data and the second data: determine (e.g., with time determining unit 1816) an amount of time remaining before a level of battery unit 1806 reaches a first threshold value, enable (e.g., with display enabling unit 1818) display of the amount of time remaining, enable (e.g., with display enabling unit 1818) display of an affordance for invoking a low-power mode, detect (e.g., with input detecting unit 1820) a selection of the affordance, and in response to detecting the selection, enter (e.g., with power mode unit 1822) the low-power mode.

In some embodiments, processing unit 1812 is further configured to: in response to detecting the selection: enable (e.g., with display enabling unit 1818) display of an indication that electronic device 1800 is in the low-power mode, and enable (e.g., with display enabling unit 1818) display of a time.

In some embodiments, electronic device 1800 further comprises at least one hardware button unit 1850 and rotatable input mechanism unit 1852. Electronic device 1800 is configured to, while in a normal power mode, produce a first output responsive to input at touch-sensitive display unit 1802, a second output responsive to input at the at least one hardware button unit 1850, and a third output responsive to input at rotatable input mechanism unit 1852. Processing unit 1812 is further configured to: in accordance with the determination that the battery level is at or below the first threshold value: enter (e.g., with power mode 1828) a low-power mode, the low-power mode characterized in that a fourth output is produced responsive to input at any of touch-sensitive display unit 1802, the at least one hardware button unit 1850, or rotatable input mechanism unit 1852.

In some embodiments, the fourth output is different than the first output, the second output and the third output.

In some embodiments, the fourth output comprises display of the current time on touch-sensitive display unit 1802.

In some embodiments, the fourth output comprises display of an indication of the battery level of battery unit 1806 on touch-sensitive display unit 1802.

In some embodiments, electronic device 1800 further comprises at least one of accelerometer unit 1854 and gyroscope unit 1856.

In some embodiments, processing unit 1812 is further configured to: while in the normal power mode: receive (e.g., with data receiving unit 1830) first data from the at least one of accelerometer unit 1854 and gyroscope unit 1856; and in accordance with a determination that the first data of the at least one of accelerometer unit 1854 and gyroscope unit 1856 exceeds a predetermined value, produce (e.g., with output producing unit 1826) a fifth output.

In some embodiments, processing unit 1812 is further configured to: while in the low-power mode: receive (e.g., with data receiving unit 1830) second data from the at least one of accelerometer unit 1854 and gyroscope unit 1856; and in accordance with a determination that the second data from the at least one of accelerometer unit 1854 and gyroscope unit 1856 exceeds the predetermined value, produce (e.g., with output producing unit 1826) the fourth output.

In some embodiments, rotatable input mechanism unit 1852 is also depressible. Processing unit 1812 is further configured to: while in the low-power mode, detect (e.g., with input detecting unit 1820) a depression of rotatable input mechanism unit 1852; determine (e.g., with time determining unit 1816) a duration of the depression of rotatable input mechanism unit 1852; and in accordance with a determination that the duration of the depression exceeds a predetermined threshold, exit (e.g., with power mode 1828) the low-power mode.

In some embodiments, rotatable input mechanism unit 1852 comprises mechanical button unit 1858, and the depression represents a press on mechanical button unit 1858.

In some embodiments, rotatable input mechanism unit 1852 comprises capacitive button unit 1860, and the depression represents a touch on capacitive button 1860.

The operations described above with reference to FIG. 15 are, optionally, implemented by components depicted in FIGS. 1A-1B or FIG. 18. For example, signal receiving operation 1502, time determining operation 1506, and detecting operation 1508 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs, the one or more programs comprising instructions, which when executed by an electronic device with a touch-sensitive display, cause the electronic device to:
   determine a battery level of a battery of the electronic device;
   in accordance with a determination that the battery level is at or below a first threshold value, cause a haptic mechanism to issue a haptic output;
   receive data indicative of a user input, wherein the data indicative of a user input is a first data and the user input is a first user input;
   determine whether the data has been received within a predetermined time interval after the haptic output;
   in accordance with a determination that the data has been received within the predetermined time interval, display a battery alert on the touch-sensitive display, wherein causing the display of the battery alert comprises causing activation of the display from an inactive state;
   after displaying the battery alert, receive second data indicative of a second user input;
   determine whether the second data indicative of the second user input has been received within a second time interval after displaying the battery alert;
   in accordance with a determination that the second data has been received within the second time interval, remove the displayed battery alert from the touch-sensitive display; and
   in accordance with a determination that the second data has not been received within the second time interval:
      determine an amount of time remaining before the battery level reaches a second threshold level, and
      display the amount of time remaining.

2. The non-transitory computer-readable storage medium of claim 1, further comprising instructions to cause the electronic device to determine the battery level while the touch-sensitive display is inactive.

3. The non-transitory computer-readable storage medium of claim 1, wherein the second user input corresponds to a movement of the electronic device.

4. The non-transitory computer-readable storage medium of claim 1, wherein the one or more programs further comprise instructions to cause the electronic device to:
   detect a swipe on the touch-sensitive display while the battery alert is displayed; and
   in response to detecting the swipe, remove the displayed battery alert from the touch-sensitive display.

5. The non-transitory computer-readable storage medium of claim 4, wherein the swipe is a substantially downward swipe.

6. The non-transitory computer-readable storage medium of claim 4, further comprising instructions to cause the electronic device to:
   remove the displayed battery alert by displaying an animation that slides the displayed battery alert off-screen in a direction of the swipe.

7. The non-transitory computer-readable storage medium of claim 4, further comprising instructions to cause the electronic device to:

remove the displayed battery alert from the touch-sensitive display by causing a display of the touch-sensitive display to become inactive.

8. The non-transitory computer-readable storage medium of claim 1, further comprising instructions to cause the electronic device to:
display the battery alert by displaying an animation that slides the battery alert upwards from a bottom of the touch-sensitive display.

9. A non-transitory computer-readable storage medium storing one or more programs, the one or more programs comprising instructions, which when executed by an electronic device with a touch-sensitive display, cause the electronic device to:
determine a battery level of a battery of the electronic device;
in accordance with a determination that the battery level is at or below a first threshold value, cause a haptic mechanism to issue a haptic output;
receive data indicative of a user input;
determine whether the data has been received within a predetermined time interval after the haptic output;
in accordance with a determination that the data has been received within the predetermined time interval, display a battery alert on the touch-sensitive display, wherein causing the display of the battery alert comprises causing activation of the display from an inactive state;
while displaying the battery alert, detect a third user input; and
in response to detecting the third user input:
determine an amount of time remaining before the battery level reaches a second threshold level, and display the amount of time remaining.

10. The non-transitory computer-readable storage medium of claim 9, wherein the third user input is a contact on the touch-sensitive display.

11. A non-transitory computer-readable storage medium storing one or more programs, the one or more programs comprising instructions, which when executed by an electronic device with a touch-sensitive display, at least one hardware button, and a rotatable input mechanism, cause the electronic device to:
wherein the electronic device is configured to, while in a normal power mode, produce a first output responsive to input at the touch-sensitive display, a second output responsive to input at the at least one hardware button, and a third output responsive to input at the rotatable input mechanism;
determine a battery level of a battery of the electronic device;
in accordance with a determination that the battery level is at or below a first threshold value:
cause a haptic mechanism to issue a haptic output; and
enter a low-power mode, the low-power mode characterized in that a fourth output is produced responsive to input at any of the touch-sensitive display, the at least one hardware button, or the rotatable input mechanism;
receive data indicative of a user input;
determine whether the data has been received within a predetermined time interval after the haptic output; and
in accordance with a determination that the data has been received within the predetermined time interval, display a battery alert on the touch-sensitive display, wherein causing the display of the battery alert comprises causing activation of the display from an inactive state.

12. The non-transitory computer-readable storage medium of claim 11, wherein the fourth output is different from the first output, the second output, and the third output.

13. The non-transitory computer-readable storage medium of claim 11, wherein the fourth output comprises a display of a current time on the touch-sensitive display.

14. The non-transitory computer-readable storage medium of claim 11, wherein the fourth output comprises a display of an indication of the battery level of the battery on the touch-sensitive display.

15. The non-transitory computer-readable storage medium of claim 11, wherein the electronic device further comprises at least one of an accelerometer and a gyroscope, further comprising instructions to cause the electronic device to:
while in the normal power mode:
receive third data from the at least one of the accelerometer and the gyroscope, and
in accordance with a determination that the third data of the at least one of the accelerometer and the gyroscope exceeds a predetermined value, produce a fifth output.

16. The non-transitory computer-readable storage medium of claim 15, further comprising instructions to cause the electronic device to:
while in the low-power mode:
receive the third data from the at least one of the accelerometer and the gyroscope, and
in accordance with a determination that the third data of the at least one of the accelerometer and the gyroscope exceeds the predetermined value, produce the fourth output.

17. A method, comprising:
at an electronic device with a touch-sensitive display, a battery, and a haptic mechanism:
determining a battery level of the battery;
in accordance with a determination that the battery level is at or below a first threshold value, causing the haptic mechanism to issue a haptic output;
receiving data indicative of a user input, wherein the data indicative of a user input is a first data and the user input is a first user input;
determining whether the data has been received within a predetermined time interval after the haptic output;
in accordance with a determination that the data has been received within the predetermined time interval, displaying a battery alert on the touch-sensitive display, wherein displaying the battery alert comprises activating the display from an inactive state;
after displaying the battery alert, receive second data indicative of a second user input;
determine whether the second data indicative of the second user input has been received within a second time interval after displaying the battery alert;
in accordance with a determination that the second data has been received within the second time interval, remove the displayed battery alert from the touch-sensitive display; and
in accordance with a determination that the second data has not been received within the second time interval:
determine an amount of time remaining before the battery level reaches a second threshold level, and display the amount of time remaining.

18. The method of claim 17, further comprising:
determining the battery level while the touch-sensitive display is inactive.

19. The method of claim 17, wherein the second user input corresponds to a movement of the electronic device.

20. The method of claim 17, further comprising:
detecting a swipe on the touch-sensitive display while the battery alert is displayed; and
in response to detecting the swipe, removing the displayed battery alert from the touch-sensitive display.

21. The method of claim 17, wherein the swipe is a substantially downward swipe.

22. The method of claim 17, further comprising:
removing the displayed battery alert by displaying an animation that slides the displayed battery alert off-screen in a direction of the swipe.

23. The method of claim 17, further comprising:
removing the displayed battery alert from the touch-sensitive display by causing a display of the touch-sensitive display to become inactive.

24. The method of claim 17, further comprising:
displaying the battery alert by displaying an animation that slides the battery alert upwards from a bottom of the touch-sensitive display.

25. An electronic device, comprising:
a battery;
a haptic mechanism;
a touch-sensitive display;
a memory; and
a processor coupled to the battery, the haptic mechanism, the touch-sensitive display, and the memory wherein the memory comprises instructions to cause the electronic device to:
determine a battery level of the battery;
in accordance with a determination that the battery level is at or below a first threshold value, cause a haptic mechanism to issue a haptic output;
receive data indicative of a user input, wherein the data indicative of a user input is a first data and the user input is a first user input;
determine whether the data has been received within a predetermined time interval after the haptic output;
in accordance with a determination that the data has been received within the predetermined time interval, display a battery alert on the touch-sensitive display, wherein causing the display of the battery alert comprises causing activation of the display from an inactive state;
after displaying the battery alert, receive second data indicative of a second user input;
determine whether the second data indicative of the second user input has been received within a second time interval after displaying the battery alert;
in accordance with a determination that the second data has been received within the second time interval, remove the displayed battery alert from the touch-sensitive display; and
in accordance with a determination that the second data has not been received within the second time interval:
determine an amount of time remaining before the battery level reaches a second threshold level, and display the amount of time remaining.

26. The electronic device of claim 25, further comprising instructions to cause the electronic device to:
determine the battery level while the touch-sensitive display is inactive.

27. The electronic device of claim 25, wherein the second user input corresponds to a movement of the electronic device.

28. The electronic device of claim 25, further comprising instructions to cause the electronic device to:
detect a swipe on the touch-sensitive display while the battery alert is displayed; and
in response to detecting the swipe, remove the displayed battery alert from the touch-sensitive display.

29. The electronic device of claim 25, wherein the swipe is a substantially downward swipe.

30. The electronic device of claim 25, further comprising instructions to cause the electronic device to:
remove the displayed battery alert by displaying an animation that slides the displayed battery alert off-screen in a direction of the swipe.

31. The electronic device of claim 25, further comprising instructions to cause the electronic device to:
remove the displayed battery alert from the touch-sensitive display by causing a display of the touch-sensitive display to become inactive.

32. The electronic device of claim 25, further comprising instructions to cause the electronic device to:
display the battery alert by displaying an animation that slides the battery alert upwards from a bottom of the touch-sensitive display.

33. A method comprising:
at an electronic device with a touch-sensitive display, a battery, and a haptic mechanism:
determining a battery level of a battery of the electronic device;
in accordance with a determination that the battery level is at or below a first threshold value, causing a haptic mechanism to issue a haptic output;
receiving data indicative of a user input;
determining whether the data has been received within a predetermined time interval after the haptic output;
in accordance with a determination that the data has been received within the predetermined time interval, displaying a battery alert on the touch-sensitive display, wherein causing the display of the battery alert comprises causing activation of the display from an inactive state;
while displaying the battery alert, detecting a third user input; and
in response to detecting the third user input:
determining an amount of time remaining before the battery level reaches a second threshold level, and displaying the amount of time remaining.

34. The method of claim 33, wherein the third user input is a contact on the touch-sensitive display.

35. An electronic device, comprising:
a battery;
a haptic mechanism;
a touch-sensitive display;
a memory; and
a processor coupled to the battery, the haptic mechanism, the touch-sensitive display, and the memory wherein the memory comprises instructions to cause the electronic device to:
determine a battery level of a battery of the electronic device;
in accordance with a determination that the battery level is at or below a first threshold value, cause a haptic mechanism to issue a haptic output;

receive data indicative of a user input;
determine whether the data has been received within a predetermined time interval after the haptic output;
in accordance with a determination that the data has been received within the predetermined time interval, display a battery alert on the touch-sensitive display, wherein causing the display of the battery alert comprises causing activation of the display from an inactive state;
while displaying the battery alert, detect a third user input; and
in response to detecting the third user input:
determine an amount of time remaining before the battery level reaches a second threshold level, and display the amount of time remaining.

36. The non-transitory computer-readable storage medium of claim 35, wherein the third user input is a contact on the touch-sensitive display.

37. A method comprising:
at an electronic device with a touch-sensitive display, a battery, a haptic mechanism, at least one hardware button, and a rotatable input mechanism:
wherein the electronic device is configured to, while in a normal power mode, producing a first output responsive to input at the touch-sensitive display, a second output responsive to input at the at least one hardware button, and a third output responsive to input at the rotatable input mechanism;
determining a battery level of a battery of the electronic device;
in accordance with a determination that the battery level is at or below a first threshold value:
causing a haptic mechanism to issue a haptic output; and
entering a low-power mode, the low-power mode characterized in that a fourth output is produced responsive to input at any of the touch-sensitive display, the at least one hardware button, or the rotatable input mechanism;
receiving data indicative of a user input;
determining whether the data has been received within a predetermined time interval after the haptic output; and
in accordance with a determination that the data has been received within the predetermined time interval, displaying a battery alert on the touch-sensitive display, wherein causing the display of the battery alert comprises causing activation of the display from an inactive state.

38. The method of claim 37, wherein the fourth output is different from the first output, the second output, and the third output.

39. The method of claim 37, wherein the fourth output comprises a display of a current time on the touch-sensitive display.

40. The method of claim 37, wherein the fourth output comprises a display of an indication of the battery level of the battery on the touch-sensitive display.

41. The method of claim 37, wherein the electronic device further comprises at least one of an accelerometer and a gyroscope, and further comprising:
while in the normal power mode:
receiving third data from the at least one of the accelerometer and the gyroscope, and
in accordance with a determination that the third data of the at least one of the accelerometer and the gyroscope exceeds a predetermined value, producing a fifth output.

42. The method of claim 41, further comprising:
while in the low-power mode:
receiving the third data from the at least one of the accelerometer and the gyroscope, and
in accordance with a determination that the third data of the at least one of the accelerometer and the gyroscope exceeds the predetermined value, producing the fourth output.

43. An electronic device, comprising:
a battery;
a haptic mechanism;
a touch-sensitive display;
at least one hardware button;
a rotatable input mechanism,
a memory; and
a processor coupled to the battery, the haptic mechanism, the touch-sensitive display, the at least one hardware button, the rotatable input mechanism, and the memory wherein the memory comprises instructions to cause the electronic device to:
wherein the electronic device is configured to, while in a normal power mode, produce a first output responsive to input at the touch-sensitive display, a second output responsive to input at the at least one hardware button, and a third output responsive to input at the rotatable input mechanism;
determine a battery level of a battery of the electronic device;
in accordance with a determination that the battery level is at or below a first threshold value:
cause a haptic mechanism to issue a haptic output; and
enter a low-power mode, the low-power mode characterized in that a fourth output is produced responsive to input at any of the touch-sensitive display, the at least one hardware button, or the rotatable input mechanism;
receive data indicative of a user input;
determine whether the data has been received within a predetermined time interval after the haptic output; and
in accordance with a determination that the data has been received within the predetermined time interval, display a battery alert on the touch-sensitive display, wherein causing the display of the battery alert comprises causing activation of the display from an inactive state.

44. The electronic device of claim 43, wherein the fourth output is different from the first output, the second output, and the third output.

45. The electronic device of claim 43, wherein the fourth output comprises a display of a current time on the touch-sensitive display.

46. The electronic device of claim 43, wherein the fourth output comprises a display of an indication of the battery level of the battery on the touch-sensitive display.

47. The electronic device of claim 43, wherein the electronic device further comprises at least one of an accelerometer and a gyroscope, further comprising instructions to cause the electronic device to:
while in the normal power mode:
receive third data from the at least one of the accelerometer and the gyroscope, and
in accordance with a determination that the third data of the at least one of the accelerometer and the gyroscope exceeds a predetermined value, produce a fifth output.

48. The electronic device of claim 47, further comprising instructions to cause the electronic device to:
while in the low-power mode:
receive the third data from the at least one of the accelerometer and the gyroscope, and
in accordance with a determination that the third data of the at least one of the accelerometer and the gyroscope exceeds the predetermined value, produce the fourth output.

* * * * *